(12) United States Patent
Gilbertson

(10) Patent No.: US 6,240,458 B1
(45) Date of Patent: May 29, 2001

(54) SYSTEM AND METHOD FOR PROGRAMMABLY CONTROLLING DATA TRANSFER REQUEST RATES BETWEEN DATA SOURCES AND DESTINATIONS IN A DATA PROCESSING SYSTEM

(75) Inventor: Roger Lee Gilbertson, Minneapolis, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/218,211

(22) Filed: Dec. 22, 1998

(51) Int. Cl.[7] ........................................... G06F 15/16
(52) U.S. Cl. ................... 709/232; 709/233; 709/234; 709/235; 710/39; 710/60
(58) Field of Search ................................. 709/234, 200, 709/222, 252, 243, 207, 238, 235, 232, 233, 240; 710/263, 264, 244, 112, 116, 39, 40, 52, 58–60; 711/150, 151; 370/395, 414

(56) References Cited

U.S. PATENT DOCUMENTS

| | | | |
|---|---|---|---|
| 4,493,021 | * | 1/1985 | Agrawal et al. . |
| 5,136,718 | * | 8/1992 | Haydt . |
| 5,222,223 | * | 6/1993 | Webb, Jr. et al. . |
| 5,560,030 | * | 9/1996 | Guttag et al. . |
| 5,881,065 | * | 3/1999 | Abriu ................................... 370/413 |
| 6,138,192 | * | 10/2000 | Hausauer ............................. 710/100 |

\* cited by examiner

*Primary Examiner*—Ario Etienne
(74) *Attorney, Agent, or Firm*—Charles A. Johnson; Mark T. Starr; Altera Law Group

(57) ABSTRACT

A system and method for selectively controlling the interface throughput of data transfer requests from request sources to request destinations. The system and method provide a manner in which the flow of data transfer requests from request sources to request destinations are controlled. The data transfer requests from each of the request sources are temporarily stored for future delivery to its addressed request destination. Delivery of the stored data transfer requests to the addressed request destination is enabled according to a predetermined delivery priority scheme. Certain stored data transfer requests are identified to be selectively suspended from being prioritized and delivered to the addressed request destination. The identified data transfer requests are suspended from delivery for a definable period of time. Upon expiration of the definable period of time, the suspended data transfer requests, as well as all other stored data transfer requests, are enabled for prioritization and delivery in accordance with the predetermined delivery priority scheme.

33 Claims, 14 Drawing Sheets

SYMMETRICAL MULTIPROCESSING PLATFORM

SYMMETRICAL MULTIPROCESSING PLATFORM

MEMORY STORAGE UNIT (MSU)

DATA VALID ROUTING LOGIC

MEMORY CLUSTER (MCL)

SYSTEM AND METHOD FOR PROGRAMMABLY CONTROLLING DATA TRANSFER REQUEST RATES BETWEEN DATA SOURCES AND DESTINATIONS IN A DATA PROCESSING SYSTEM

CROSS-REFERENCE TO OTHER PATENT APPLICATIONS

The following co-pending patent application of common assignee contains some common disclosure:

"Multi-Level Priority Control System And Method For Managing Concurrently Pending Data Transfer Requests", filed concurrently herewith with assigned Ser. No. 09/218,377, which in incorporated by reference in its entirety;

"Transfer Request Selection Method And Apparatus For Symmetrical Multiprocessor Systems", filed concurrently herewith with assigned Ser. No. 09/218,210, which is incorporated by reference in its entirety; and "Queueing Architecture And Control System For Data Processing System Having Independently-Operative Data And Address Interfaces", Ser. No. 09/096,822, filed Jun. 12, 1998, which is incorporated herein by reference in its entirety.

FIELD OF THE INVENTION

This invention relates generally to data transfer request management in data processing systems, and more particularly to an interface and programmable interface control system and method for selectively providing, and controlling the rate of, data transfer requests to destination resources, thereby providing the ability to manipulate data throughput under normal operating conditions, and to provide a means for performing transaction processing testing.

BACKGROUND OF THE INVENTION

Data processing systems generally include multiple units such as processing units, memory units, input/output units, and the like, which are interconnected over one or more system interfaces. The interfaces provide for the transfer of digital signals between the units. Since many of the operations within data processing systems involve such transfers, the efficiency of the interfaces has a major impact on the overall performance of the data processing system.

Many conventional interfaces used within data processing systems have several types of signal lines, including data lines for transferring data signals, and address lines for transferring address signals. The address lines generally provide information indicative of the type of request, and further indicate a unit and/or a particular addressable resource associated within the unit that is involved with the request. The data lines provide data signals which are associated with the request.

Requests for data transfers may occur at a faster rate than the memory and associated cache coherency logic can sustain. A buffering technique may be used to queue such requests until they can be processed. However, the queuing function can sometimes result in inefficient and discriminatory request servicing. In some cases, one processor's requests may be repeatedly processed, while another's are left relatively unattended. In other cases, a processor having relatively few requests may needlessly tie up system resources by receiving unnecessary request service polls. These situations can reduce available request bandpass, and increase the probability of request stalling or request lockout. To address this issue, the buffering technique may include a priority scheme to output the data transfer requests according to a priority assigned to each of the data transfer requests. One priority scheme known in the art is known as a "fixed" request priority scheme. Each requester is assigned a fixed priority value, and requests are handled according to this associated priority value. Those requests having a high fixed priority value are always handled prior to those having relatively low priority values. Another request priority scheme is referred to as "snap-fixed", where input request activity is continually or periodically polled. This results in a captured "snapshot" of the request activity at a given time. All of the captured requests are processed in a fixed order until all requests in the snapshot have been processed, at which time a new snapshot is taken. A "simple rotational" priority scheme involves changing the requester priority on a periodic basis. For example, the requester priority may be changed whenever a request is granted priority. Requester (N−1) moves to priority level (N), requester (N) moves to (N+1), and so forth.

Regardless of the priority scheme used, there may be times when the implemented priority scheme inhibits execution of a desired system operation. For example, testing of a complex multiprocessing system having multiple data transfer sources and multiple data transfer destinations can be incredibly complicated, particularly where test programs must be written to simulate transaction "stress" situations. Such a transaction stress situation may occur during normal operation where some resources, like memory, are suddenly inundated with pending data transfer requests. When this occurs, memory response times may be reduced, causing the data transaction queues to fill. The requesting modules must be able to accommodate this situation to avoid queue overrun problems, and it is therefore important to be able to simulate and test these conditions. Further, the memory resources must be able to manage and absorb the high volume of sudden request traffic and properly respond to the requesting modules. Again, these situations require thorough testing.

In order to prepare test programs to simulate these stress conditions, a detailed knowledge of the entire hardware implementation would be required in order to predict the direct effect on system hardware produced by test program stimulus. The time, required resources, complexity and cost of preparing such test programs is prohibitive.

It would therefore be desirable to provide an efficient arrangement and method that allows data transfer request queues to be controlled, or "throttled", by way of simple user-defined parameters. Implemented priority schemes can be maintained, but can be selectively bypassed to perform stress tests, or to accommodate peculiar situations which might arise during normal operation. The present invention provides such a solution, and provides these and other advantages and benefits over the prior art.

SUMMARY OF THE INVENTION

The present invention relates to a system and method for selectively controlling the interface throughput of data transfer requests from request sources to request destinations, thereby providing the ability to manipulate data throughput under normal operating conditions, and to provide a means for performing transaction processing testing.

In accordance with one embodiment of the invention, a method is provided for controlling the flow of data transfer requests from various request sources to various request destinations. Each data transfer request is a request for an addressed one of the request destinations to supply a data segment to the requesting source. The data transfer requests from each of the request sources are temporarily stored for future delivery to its addressed request destination. Delivery of the stored data transfer requests to the addressed request destination is enabled according to a predetermined delivery priority scheme. Certain ones of the stored data transfer requests are identified to be selectively suspended from being prioritized and delivered to the addressed request destination. These identified data transfer requests are suspended from delivery for a definable period of time. During this time, the destination addressed by the suspended data transfer requests will not receive any of these requests. Upon expiration of the definable period of time, the suspended data transfer requests, as well as all other stored data transfer requests, are enabled for prioritization and delivery in accordance with the predetermined delivery priority scheme. In this manner, the suspended data transfer requests will gain priority during the period of suspension, and will thereafter be provided to the destination according to their respective priorities.

In accordance with another embodiment of the invention, a method is provided for controlling the flow of data transfer requests during normal system operations of a multiprocessing computing system that has multiple request sources that provide data transfer requests to multiple request destinations. The data transfer requests are prioritized according to a predetermined request dispatch priority scheme. Each data transfer request is a request for an addressed one of the request destinations to supply a data segment to a respective one of the request sources. The method includes periodically performing first data transfer operations between a first request source and a targeted request destination. A second data transfer operation is initiated between a second request source and the targeted request destination, wherein the second data transfer operation is subject to a response timeout limitation. The first data transfer operations are suspended for a user-defined period upon recognition of initiation of the second data transfer operation, and the second data transfer operations are enabled during the user-defined period. Upon expiration of the user-defined period, both the first and second data transfer operations are enabled in accordance with the predetermined request dispatch priority scheme.

In accordance with yet another embodiment of the invention, a method is provided for controlling the flow of data transfer requests during offline testing of a multiprocessing computing system having a plurality of request sources capable of providing data transfer requests to a plurality of request destinations in accordance with a predetermined request dispatch priority scheme. The multiprocessing computing system including a main storage unit having multiple data transfer queues that operate in parallel to temporarily store the data transfer requests from the request sources to the request destinations. The method includes selecting a first of the plurality of data transfer queues to initialize the memory in the main storage unit. A number of known data transfer requests are loaded into second ones of the plurality of data transfer queues, wherein the second ones of the data transfer queues comprise at least one of the remaining ones of the data transfer queues not selected to initialize the memory. Data transfer operations are prohibited from the second data transfer queues for a user-defined period. A memory initialization sequence is executed via the first data transfer queue. The data transfer operations are enabled from the second data transfer queues upon expiration of the user-defined period.

In accordance with another aspect of the invention, a data transfer request interface circuit is provided for use in a multiprocessing computing system having at least one request source to provide data transfer requests to at least one request destination. The interface circuit includes a queuing circuit coupled to each of the request sources to receive and temporarily store the data transfer requests. A priority logic circuit is coupled to the queuing circuit to prioritize a sequence by which the stored data transfer requests are output from the queuing circuit. The priority logic operates in accordance with a predetermined priority algorithm. A masking register is coupled to the priority logic circuit to mask predetermined stored data transfer requests from being considered by the priority logic circuit in response to a masking signal pattern provided to the masking register. In this manner, the predetermined ones of the stored data transfer requests are retained in the queuing circuit while the remaining stored data transfer requests are allowed to be prioritized and output from the queuing circuit. A configurable request flow controller is coupled to the masking register to generate the masking signal pattern in response to user-defined parameters. The user-defined parameters define at least which of the stored data transfer requests are to be masked by the masking register, and the duration to which the masking signal pattern is to be sustained.

Still other objects and advantages of the present invention will become readily apparent to those skilled in this art from the following detailed description. As will be realized, the invention is capable of other and different embodiments, and its details are capable of modification without departing from the scope and spirit of the invention. Accordingly, the drawing and description are to be regarded as illustrative in nature, and not as restrictive.

BRIEF DESCRIPTION OF THE DRAWINGS

The invention is described in connection with the embodiments illustrated in the following diagrams.

DETAILED DESCRIPTION OF THE ILLUSTRATED EMBODIMENTS

Generally, the present invention provides a system and method for controlling the throughput of data transfer requests through a source-to-destination interface. The invention provides programmable control of the removal of data transfer requests from queuing structures to destination resources such as memory, and further provides for control of the rate at which requests are removed from the queuing structures, including a complete suspension of data transfers for a user-defined period. Control of request removal rates is dynamically configurable, allowing flexibility and ease of use. The present invention facilitates stress testing of both the requester and request receiver, and is available for system fine-tuning during normal (non-test) system execution as well as for extensive offline test execution.

While the present invention is particularly advantageous in the context of a Symmetrical Multi-Processor (SMP) environment as described below, it will be appreciated by those skilled in the art that the invention is equally applicable to other computing environments requiring management of memory, I/O, or other transaction processing requests. Therefore, the particular SMP environment described in the following figures is provided for illustrative purposes and to provide a full operational understanding of the invention; however the invention is not limited thereto.

Figure 1:
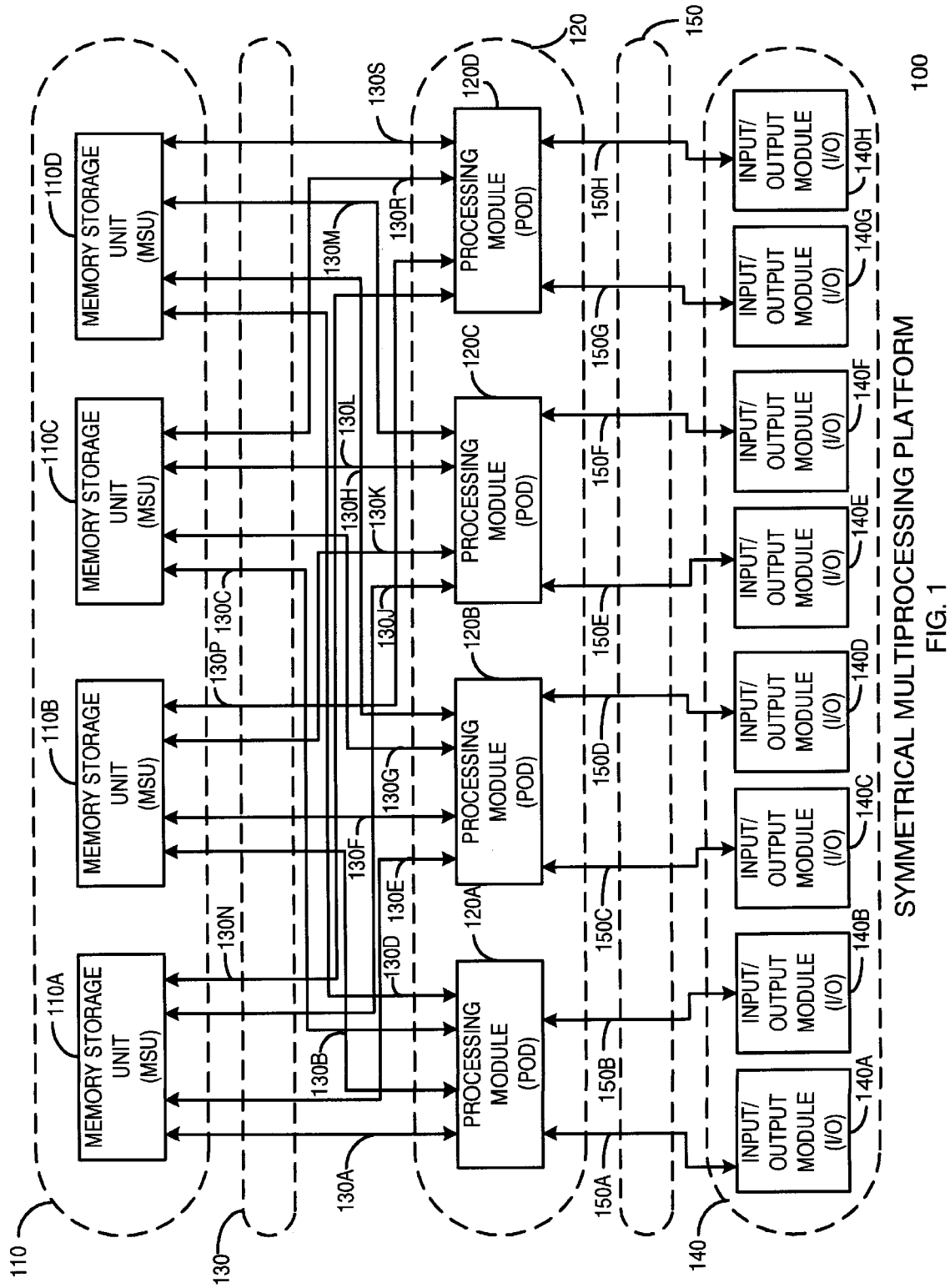
FIG. 1 is a block diagram of a Symmetrical Multi-Processor (SMP) System Platform in which the principles of the present invention may be applied.

FIG. 1 is a block diagram of a Symmetrical Multi-Processor (SMP) System Platform in which the principles of the present invention may be applied. System Platform 100 includes one or more Memory Storage Units (MSUs) in dashed block 110 individually shown as MSU 110A, MSU 110B, MSU 110C and MSU 110D, and one or more Processing Modules (PODs) in dashed block 120 individually shown as POD 120A, POD 120B, POD 120C, and POD 120D. Each unit in MSU 110 is interfaced to all PODs 120A, 120B, 120C, and 120D via a dedicated, point-to-point connection referred to as an MSU Interface (MI) in dashed block 130, individually shown as 130A through 130S. For example, MI 130A interfaces POD 120A to MSU 110A, MI 130B interfaces POD 120A to MSU 110B, MI 130C interfaces POD 120A to MSU 110C, MI 130D interfaces POD 120A to MSU 110D, and so on. Each MI provides the respective POD 120 direct access to data stored in the respective MSU 110.

In this example SMP environment, MI 130 comprises separate bi-directional data and bi-directional address/command interconnections, and further includes unidirectional control lines that control the operation on the data and address/command interconnections (not individually shown). The control lines operate at a system clock frequency (SYSCLK) while the data bus runs source synchronous at two times the system clock frequency (2× SYSCLK). For example, in one embodiment, the system clock frequency is approximately 100 megahertz (MHZ).

Any POD 120 has direct access to data in any MSU 110 via one of MIs 130. For example, MI 130A allows POD 120A direct access to MSU 110A and MI 130F allows POD 120B direct access to MSU 110B. Each MSU 110 is capable of receiving store/fetch requests from up to four PODs 120 at one time via the MI interfaces 130. These requests can be routed to storage within the MSU 110 for writing or reading data, or requests can cause data to be routed directly to another POD 120. PODs 120 and MSUs 110 are discussed in further detail below.

System Platform 100 further comprises Input/Output (I/O) Modules in dashed block 140 individually shown as I/O Modules 140A through 140H, which provide the interface between various Input/Output devices and one of the PODs 120. Each I/O Module 140 is connected to one of the PODs across a dedicated point-to-point connection called the MIO Interface in dashed block 150 individually shown as 150A through 150H. For example, I/O Module 140A is connected to POD 120A via a dedicated point-to-point MIO Interface 150A. The MIO Interfaces 150 are similar to the MI Interfaces 130, but may have a transfer rate that is approximately half the transfer rate of the MI Interfaces because the I/O Modules 140 are located at a greater distance from the PODs 120 than are the MSUs 110.

Figure 2:
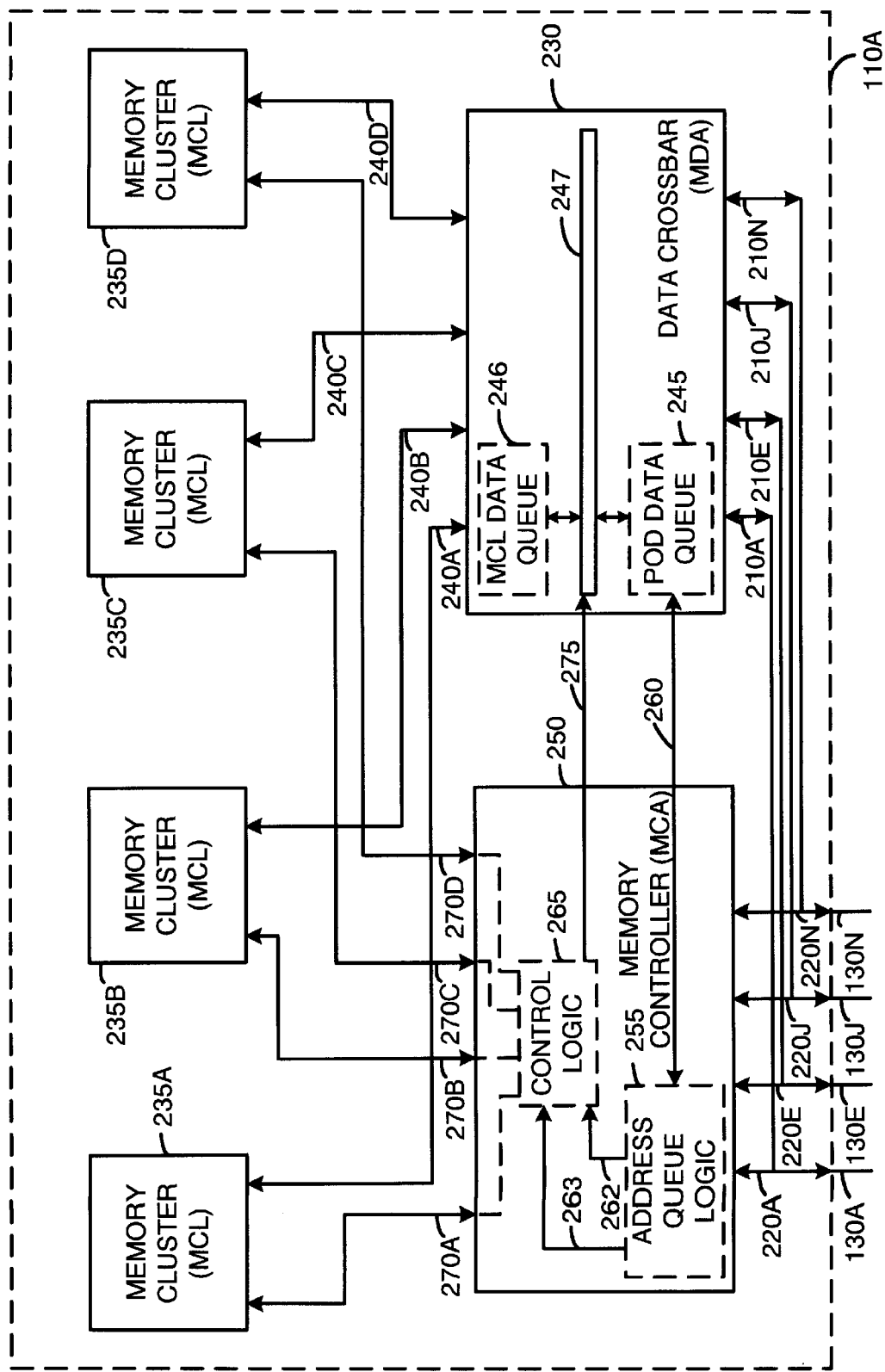
FIG. 2 is a block diagram of one embodiment of a Memory Storage Unit (MSU)

FIG. 2 is a block diagram of a Memory Storage Unit (MSU) 110. Although MSU 110A is shown and discussed, it is understood that this discussion applies equally to each of the MSUs 110. As discussed above, MSU 110A interfaces to each of the PODs 120A, 120B, 120C, and 120D across dedicated point-to-point MI Interfaces 130A, 130E, 130J, and 130N, respectively. Each MI Interface 130 actually includes two separate, independently-operative interfaces. The first interface is shown as Data Interface 210 (illustrated as 210A, 210E, 210J, and 210N). Each set of Data Interfaces 210 includes bi-directional data bits, parity signals, and uni-directional control signals (not individually shown in FIG. 2). In addition to the Data Interfaces 210, each MI Interface 130 includes bi-directional Address/function Interfaces 220 (shown as 220A, 220E, 220J, and 220N), each of which includes address/function signals, uni-directional control signals, and a uni-directional address request (not individually shown in FIG. 2). Data Interfaces and Address/function Interfaces operate in split transaction mode. That is, for a given request, the data signals provided on Data Interfaces 210, and the Command information provided on Address/function Interfaces 220 may be transferred at different times during completely disassociated transfer operations, as is discussed further below.

Generally, a request provided by the POD 120 is stored in two logical entities within the MSU 110. The address and function portion of a request are routed to the Memory Controller (MCA) 250 and stored in a store/fetch queue. It should be recognized that the term "queue" is not restricted to a narrow definition such as a first-in-first-out (FIFO) structure, but rather is defined broadly as a temporary storage structure where requests/data can be temporarily stored until further processing can continue. The data portion of the request is stored in the Memory Data Crossbar (MDA) 230 in one of a plurality of POD Data Queues 245. The data portion of a request is routed via a crossbar interconnect 247 to either an Memory Cluster (MCL) Data Queue 246 for an addressed one of the Memory Clusters 235, or will be routed to another POD Data Queue 245 to be transferred directly to another POD during a POD-to-POD data transfer operation. Similarly, data returned to a POD following a fetch request is routed via interconnect 247 from the addressed one of the MCL Data Queues 246 to the POD Data Queue 245 which is associated with the requesting POD. The routing of this information is controlled via control lines provided to the MDA by the MCA. The following paragraphs describe the MSU 110 of FIG. 2 in greater detail.

Data Interface 210A, 210E, 210J, and 210N interface to the Memory Data Crossbar (MDA) 230. The MDA 230 buffers data signals received on Data Interfaces 210 from the PODs 120, and provides the switching mechanism that may route these buffered data signals to an addressed one of the storage units called Memory Clusters (MCLs) 235 (shown as 235A, 235B, 235C, and 235D) via Bi-directional Interfaces 240 (shown as 240A, 240B, 240C, and 240D). Data signals are also returned from MCLs 235 to a requesting POD 120 via Bi-directional Interfaces 240 and MDA 230.

In addition to routing data signals between various ones of the PODs 120 and ones of the MCLs 235, the MDA 230 also routes buffered ones of the data signals received from PODs to any ones of the PODs during POD-to-POD transfer operations to be discussed further below. For example, data signals received from POD 120A and buffered by MDA 230 may be routed to Data Interface 210A, 210E, 210J, or 210N for reception by POD 120A, 120B, 120C, or 120D, respectively.

The MDA buffers the data signals provided by PODs 120 via Data Interfaces 210 in POD data queue structures. A distinct queue structure is provided for each of the Data Interface 210A, 210E, 210J, and 210N. In FIG. 2, the POD data queue structure associated with Data Interface 210A is shown as POD Data Queue 245. Similar queue structures (not shown) exist for the other Data Interfaces 210E, 210J, and 210N. POD Data Queue 245 can be any addressable storage device capable of storing a predetermined maximum number of data signals.

The MDA also buffers the data signals provided by MCLs 235 via Data Lines 240 in MCL data queue structures. A different queue structure is provided for each of the Data Lines 240A, 240B, 240C, and 240D. In FIG. 2, the MCL data queue structure associated with Data Lines 240A is shown as MCL Data Queue 246. Similar queue structures (not shown) exist for the other Data Lines 240B, 240C, and 240D. MCL Data Queue 246 can be any addressable storage device capable of storing a predetermined maximum number of data signals.

Whereas the MDA 230 buffers data signals provided via Data Interfaces 210 and Data lines 240, the Memory Controller (MCA) 250 buffers the address and control signals associated with POD-to-MSU requests that are provided via Address/function Interfaces 220. The MCA includes an input queue structure for each of the Address/function Interfaces 220. The input queue structure for Address/function Interface 220A is shown in FIG. 2 as Address Queue 255. Similar address queue structures (not shown) are provided for each of the other Address/function Interfaces 220E, 220J, and 220N.

As mentioned above, for those requests during which the POD provides data to the MSU, which includes message operations and most memory store operations, the command and associated data are not necessarily transferred by the POD to the MSU at the same time. This is because the Data Interfaces 210 and the associated Address/function Interfaces 220 do not operate in lock step. Therefore, for predetermined request types, address and control signals may precede the associated data signals or vice versa. Thus data signals may be stored within POD Data Queue 245 until the associated address is received on Address/function Interfaces 220. Alternatively, address signals may be stored temporarily in Address Queue 255 until the associated data signals are received on Data Interfaces 210. The indication that data is being transmitted by the POD is provided by a uni-directional control signal in each set of Data Interfaces 210. This signal is used to correlate address signals stored within Address Queue 255 to associated data signals stored within POD Data Queue 245 in a manner to be discussed in detail below.

Once both address signals and associated data signals for a given POD request are resident within the respective queue structures, the address signals are provided on Lines 262 or 263 to Control Logic 265 for further processing in a manner to be discussed below. Control Logic 265 provides arbitration and control to gate the address and appropriate read/write control to the appropriate one of the MCLs 235 across address Lines 270 (shown as 270A, 270B, 270C, and 270D) if the request involves a memory operation. Control Logic 265 further provides Control Signals 275 to Data Queue Interconnect Logic 247. Control Signals 275 provide all the data routing control to logically connect a data source queue to a data destination queue. Control Signals 275 control interconnection of source and destination data queues, and also initiate sequences to move the data. Data can be transferred from POD Data Queue 245 to MCL Data Queue 246 for memory stores, MCL Data Queue 246 to POD Data Queue 245 for memory fetches, or POD Data Queue 245 to another one of the POD Data Queues (not shown) for POD-to-POD message transfer operations, or other POD-to-POD operations.

Figure 3:
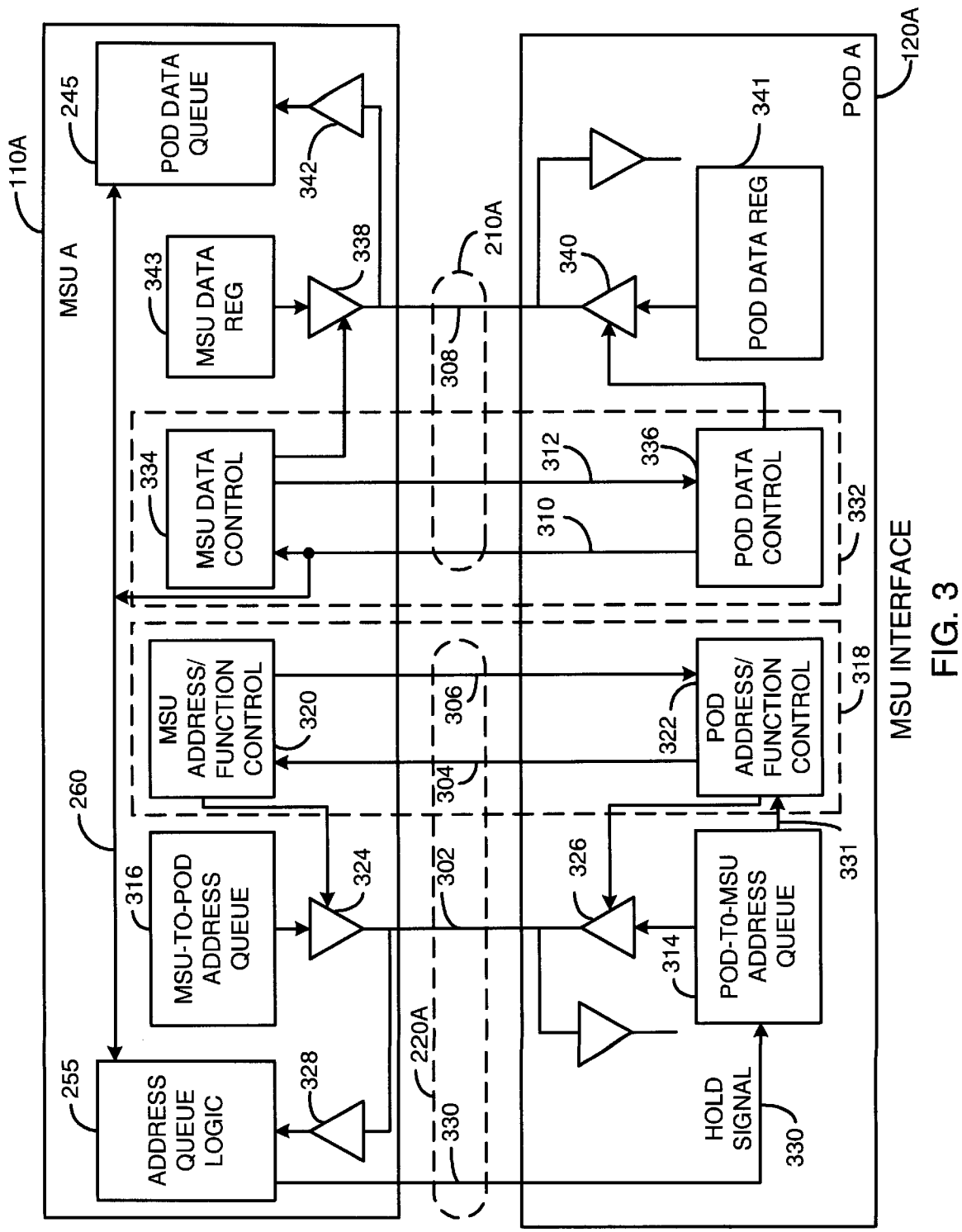
FIG. 3 is a block diagram of bi-directional MSU Interface (MI) and associated interface control logic.

FIG. 3 is a block diagram of bi-directional MSU Interface (MI) 130A and associated interface control logic. A similar structure is associated with each of the MI Interfaces 130. As discussed above, MI 130A includes Address/function Interface 220A and Data Interface 210A (shown dashed). These bi-directional interfaces transfer address and data information, respectively, between POD 120A and MSU 110A. These interfaces do not operate in lock step. That is, at any instant in time, the transfer operation being performed on the Address/function Interface 220A may be associated with a different request than is being serviced on Data Interface 210A.

The Address/function Interface 220A includes bi-directional Address/Function (A/F) Lines 302 which in one embodiment contains 21 signals for transferring address and control information, and also include associated parity signals. Address/function Interface 220A also include an associated POD Request Signal 304, (also called "P_REQ"). When a request is initiated from the POD to the MSU, the POD Request Signal 304 is asserted, and the A/F Lines 302 are driven by the POD during a two-cycle transfer operation which is capable of conveying up to 42 bits of address and control information regarding the request. The control information provided by the A/F Lines includes information indicating the type of request being made. The types of requests which may be indicated by the A/F Signals include POD requests to store/fetch data to/from memory, I/O requests to gain memory access, and requests to send message data signals from one POD to another POD. A/F Lines also convey address information which varies depending on the type of request being submitted. During requests to store/fetch data to/from memory, the A/F Lines 302 provide a MSU address associated with the requested data transfer. For a POD-to-POD message request, the A/F Signals identify the destination POD 120 which is to receive associated message data, and also identify other specific information about the type of message.

The bi-directional A/F Lines 302 may also be driven by the MSU after the MSU gains control of the interface by asserting the MSU Request Signal 306. MSU 110A drives the A/F Lines 302 to provide a function code and associated address signals to POD 120A which cause the POD to perform a specified operation. These operations are associated with maintaining coherency between the MSUs 110 and various cache memories in Platform 100. For example, a Return function code is issued by MSU 110A to POD 120A after another one of the PODs 120 or I/O Modules 140 requests access to data which may have been updated within one of the caches located in POD 120A. When POD 120A receives the Return function code, the POD responds by returning the addressed data to the MSU so that the other POD or I/O Module may have access to that data. This return of data is a type of store command and will cause a memory store. The return may also cause a POD-to-POD data transfer if this type of operation is enabled in the MSU. Similarly, a Purge function code is issued by MSU 110A to POD 120A when data stored within one of the cache memories within POD 120A becomes unusable for various coherency reasons.

MI Interface 130A also includes Data Interface 210A. Data Interface 210A of one embodiment includes Data Signal Lines 308 which contain 64 bi-directional data lines and associated parity and parity error signals (not individually shown.) Data Interface 210A also includes Data Request Signal 310 (or "P_ARB"), which is asserted by the POD when the POD initiates a POD-to-MSU data transfer operation. Several clock cycles later, the data is transferred from the POD to the MSU in eight successively-performed 8-byte transfer operations so that the total transfer conveys a 64-byte packet. In one embodiment, each of the 8-byte transfer operations occurs at a rate of twice the system clock frequency.

Data is transferred from the POD to the MSU via Data Signal Lines 308 during message transfer operations when POD 120A is sending message data to be routed to another POD via the MSU 110A. Data is also sent to the MSU 110A during most, but not all, store operations. (For simplicity, this Specification will discuss "store" operations as those stores that are associated with POD-supplied data signals.) Finally, data is sent by the POD to the MSU via Data Signal Lines 308 following the POD's reception of a Return function from the MSU, as discussed above. During each of these transfers, the POD gains control over Data Signal Lines 308 by asserting the Data Request Signal 310.

The MSU 110A also performs transfer operations over Data Signal Lines 308 to the POD 120A. These transfer operations occur when the MSU returns requested fetch data, provides a POD-to-POD pathway for routing returned data from one POD to another POD, or provides message data which is routed from a different POD 120. In any of these instances, the MSU arbitrates and gains control of the Data Signal Lines 308 using the Response Signals on Line 312. The Response Signals are a group of vectored signals which informs the POD of the type of operation being performed; for example, whether the data is associated with a message data transfer or a fetch data transfer. In the case of data associated with a fetch data transfer, the Response Signals also provide the correlation between the previously-issued POD-to-MSU fetch request, and the data being returned by the MSU 110A. This correlation is performed using a multi-bit code called a "job number". This number is necessary because memory requests are not necessarily processed in the order in which they are received from POD 120A. Therefore MSU 110A must inform POD 120A which request is associated with returned data.

As discussed above, Address/function Interface 220A operates independently of Data Interface 210A. That is, for a given request, there is no rigid timing relationship between the transfer of data and the transfer of the associated address and control signals. POD 120A queues address signals for transfer via Address/function Interface 220A in the POD-to-MSU Address Queue 314, and the MSU 110A queues address and function codes in the MSU-to-POD Address Queue 316. The control of request selection for the A/F Lines 302 is performed using Distributed Address/function State Machine 318, which includes MSU Address/function Control 320 and POD Address/function Control 322. Distributed Address/function State Machine 318 uses the POD Request Signal 304 and the MSU Request Signal 306 to arbitrate for use of A/F Lines 302, and to bias tri-state drivers 324 and 326 based on the outcome of the arbitration.

After address and control information is transferred by POD 120A on A/F Lines 302 to MSU 110A, this information is driven via tri-state Receiver 328 to Address Queue Logic 255 where it is stored until it is ready to be processed by the MSU 110A. If the request is associated with data, the request information must be stored within Address Queue Logic 255 until the associated data signals are transferred by POD 120A to the MSU. Since the address and data interfaces are not synchronized, there is no predetermined time when this must occur. Address Queue Logic 255 is capable of storing a predetermined maximum number of commands, which in a preferred embodiment is sixteen. Before this predetermined maximum number has been reached, the Address Queue Logic 255 asserts the Hold Signal 330 to POD-to-MSU Address Queue 314, which then forwards the Hold Signal on Line 331 to POD Command Control 322. The Hold Signal prevents POD Address/function Control 322 from sending more requests until the Hold Signal is de-asserted. The MSU asserts the Hold Signal early enough so that address transfers which are already in the process may be completed, and no overrun conditions occur within the Address Queue Logic 255. The Hold Signal 330 is therefore another mechanism used to throttle the rate at which address signals are sent by the POD to the MSU.

Control of Data Interface 210A is similar to the control provided for Address/function Interface 220A. Distributed Data State Machine 332, which includes MSU Data Control 334 and POD Data Control 336, controls the use of Data Signal Lines 308 through the Data Request Signal 310 and the Response Signals 312. Distributed Data State Machine 332 biases tri-state drivers 338 and 340 based on the outcome of the arbitration.

Before transmission over Data Signal Lines 308, data signals are stored in POD Data Register 341. When the POD obtains control of the interface, these signals are driven by tri-state Driver 340 to the MSU. Within the MSU, the data signals are driven to POD Data Queue 245 via Receiver 342, where they are stored until they are selected for processing by the MSU 110A. When data signals are transferred by MSU 110A to POD 120A, the data signals are provided by MSU Data Register 343, and are passed to a buffer (not shown) within POD 120A where they await routing to the appropriate cache memory.

Since address and data signals for a POD-to-MSU store or message request are not necessarily transferred at the same time, address and data information associated with the same request must be correlated sometime after this information is transferred over the Address/function Interface 220A and Data Interface 210A, respectively. In the MSU, this correlation process is performed using the unidirectional Data Request Signal 310 in conjunction with state information contained within MSU Data Control 334, and address information queued in the Address Queue Logic 255. The MSU Data Control 334 forwards the Data Request Signal 310 to Address Queue Logic 255 and to Data Queue 245 on the interface shown as Control Lines 260A and 260, as will be described below.

Figure 4:
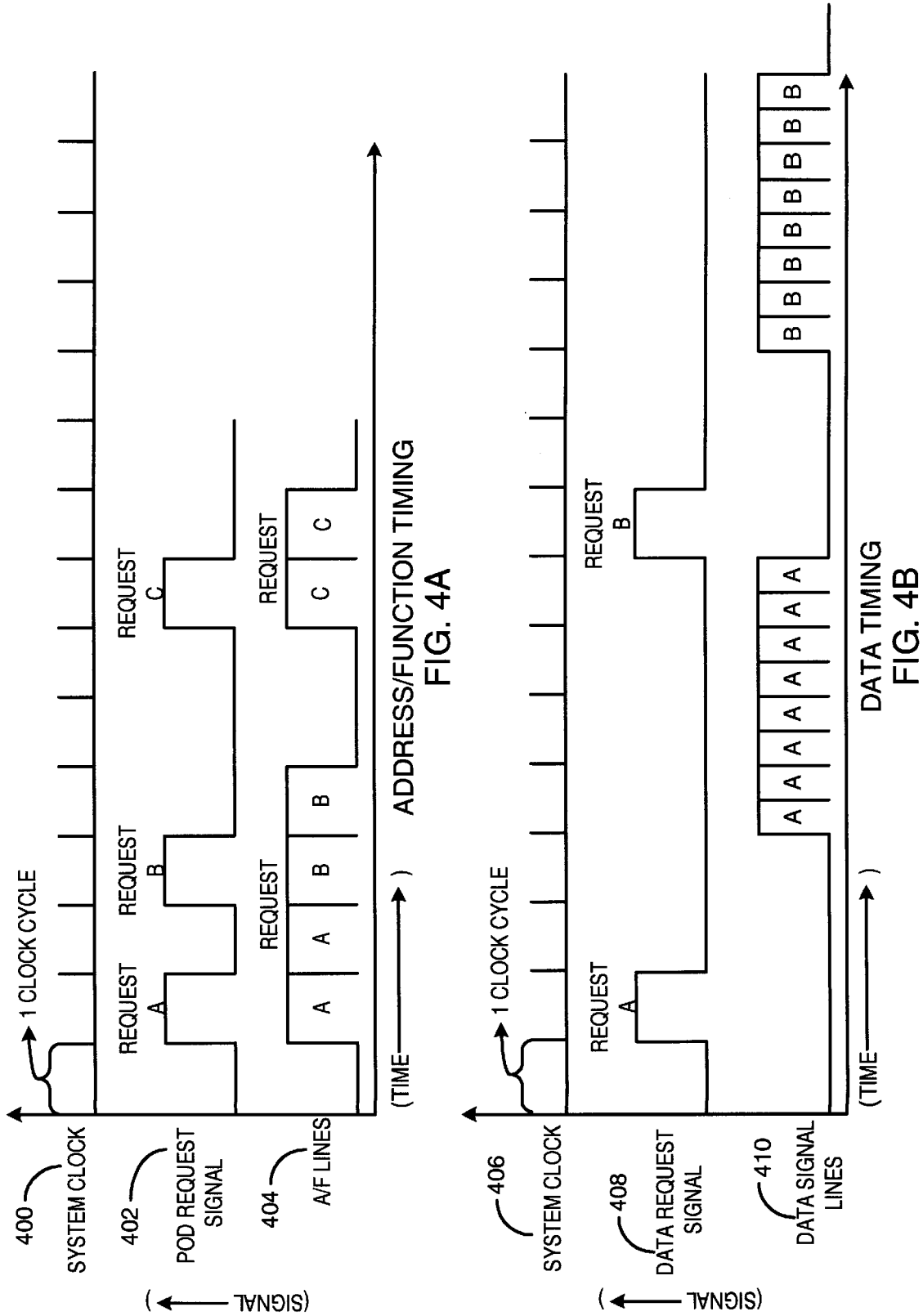
FIG. 4A is a timing diagram of a POD-to-MSU address transfer.
FIG. 4B is a timing diagram of a POD-to-MSU data transfer.

FIG. 4A is a timing diagram of a POD-to-MSU address transfer. The timing diagram is discussed in terms of MI 130A, although it is understood that this discussion applies to all MIs 130. Waveform 400 represents the system clock, which in one embodiment operates at 100 MHz. As shown in waveform 402, the uni-directional POD Request Signal 304 is asserted for one clock cycle each time a POD-to-MSU command transfer is performed. This informs the MSU 110A that POD 120A is performing a transfer on the Address/Function (A/F) Lines 302. At the same time the POD asserts POD Request Signal 304, the first of two consecutive transfers is initiated on the A/F Lines 302. This transfer requires one clock cycle to complete and is immediately followed by a second transfer. In total, the two-cycle transfer conveys 42 bits of address and control information to the Address Queue Logic 255. It may be noted that two requests may be made back-to-back on the interface, as shown by the back-to-back occurrence of Requests A and B in waveform 404 of FIG. 4A. Sometime later, this waveform shows Request C being made. The scheduling and control over the use of A/F Lines 302 is provided by Distributed Address/Function State Machine 318 as discussed above.

FIG. 4B is a timing diagram of a POD-to-MSU data transfer. As in FIG. 4A discussed above, waveform 406 represents the system clock, which in one embodiment operates at 100 MHz. Uni-directional Data Request Signal 310 is asserted for one clock cycle each time a POD-to-MSU data transfer is about to be performed to inform the MSU that the POD is arbitrating for use of the Data Signal Lines 308 as illustrated in waveform 408. When the MSU receives the asserted Data Request Signal, the MSU will complete any current transfer of data on Data Signal Lines 308, and will then relinquish control of the interface. Distributed Data State Machine 332 within the POD indicates when the MSU transmission is completed. After the MSU has relinquished control of the interface, a minimum of one clock cycle must occur while the bus settles. As shown in FIG. 4B, the POD must wait a minimum of three clock cycles between the initial assertion of the Data Request Signal and the first transmission of data on Data Signal Lines 308 regardless of whether the MSU is using the Data Signal Lines when the request is made. When the POD begins the data transfer, eight consecutive transfer operations are performed on the 64-bit (8-byte) Data Signal Lines 308 at twice the system clock frequency, as shown in waveform 410. The transferred 64-byte packet is buffered in POD Data Queue 245, matched with the associated address using the queue mechanism discussed below, and finally selected by the MSU for processing. A second data request may be made immediately following the first request, as shown in FIG. 4B.

There is no rigid timing relationship imposed between the transmission of data and the transmission of the associated command signals. Allowing the Address/function Interface 220A to operate independently of the Data Interface 210A is especially important since many requests within the exemplary system described do not require the immediate transmission of data signals from the POD to the MSU. Address and control information associated with requests that do not require transmission of data signals may be transferred on the independent Address/function Interface while an unrelated data transfer is completing on the Data Interface 210A, thereby increasing system throughput. Requests not associated with POD-to-MSU data transfers include POD and I/O requests to fetch data from the MSU, some special store operations, and some commands issued by the MSU to the POD.

Although there is no rigid timing relationship imposed between address and data transfer operations for a given request, it is required that for those requests associated with data signals, the same order be maintained for the transfer operations performed on the Address/function Interface 220A and the transfer operations performed on the Data Interface 210A. For example, if address and control information is transferred via Address/function Interface 210A for request A, then for request B, the same ordering must be maintained for the later-performed data transfer operations. The data for request B may not precede that for A.

In some instances, it may also be required that the POD Request Signal 304 be asserted sometime prior to, or at the same time as, the assertion of the associated Data Request Signal 310. This requirement is not considered a limitation because A/F Lines 302 are capable of transferring approximately three times the number of requests in a given time period as compared to Data Signal Lines 308. Therefore, for a given transfer, the A/F Lines 302 are generally available for use either before, or at the same time as, the Data Signal Lines 308 become available. The POD Request Signal 304 may be asserted after the Data Request Signal 310 in those cases in which the MSU will be performing one or more command transfers to POD 120A on A/F Lines 302 when POD 120A seeks to perform both an address transfer and an associated data transfer to the MSU. In these situations, POD 120A is allowed to perform one data transfer which precedes the associated command transfer.

Figure 5:
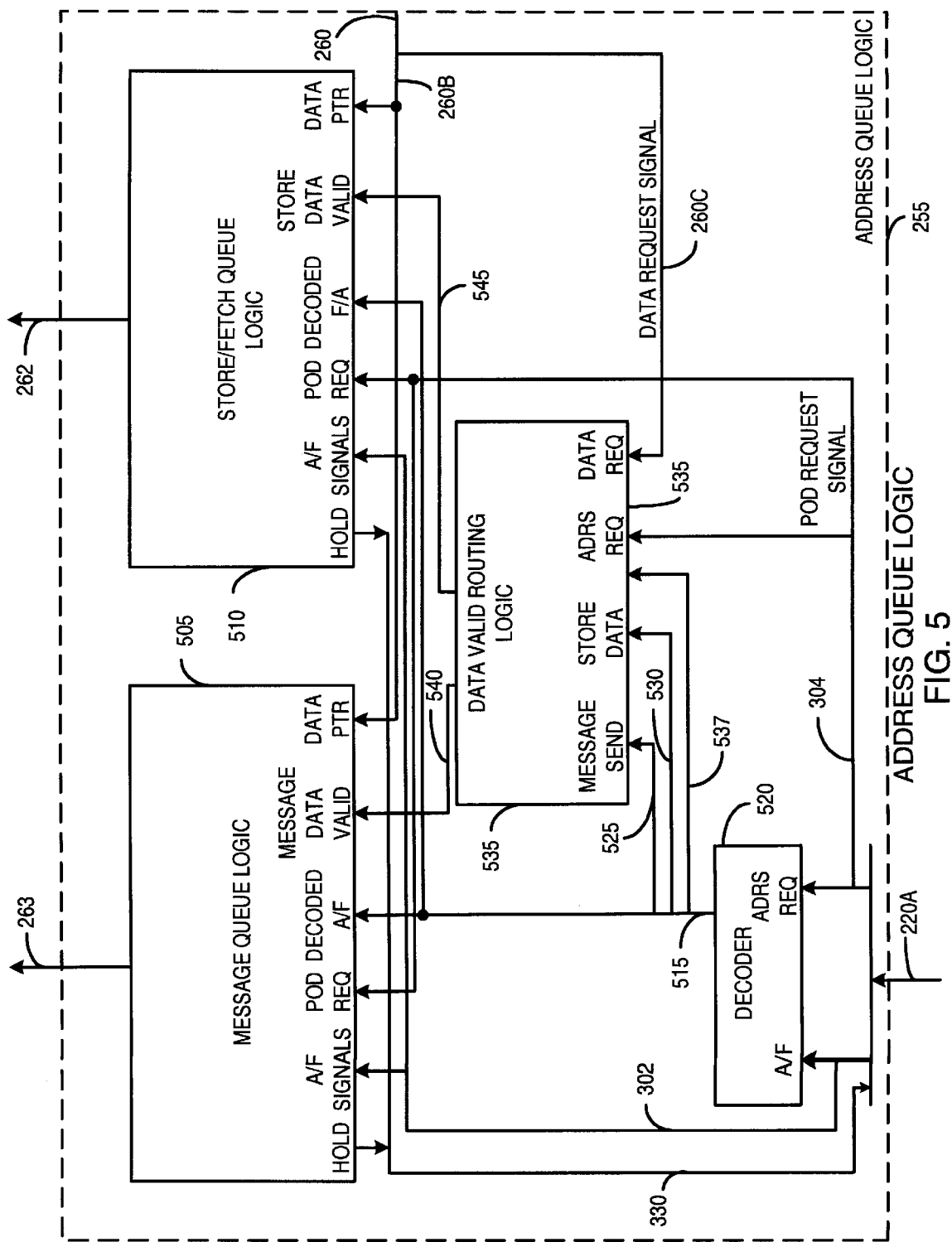
FIG. 5 is a block diagram of one embodiment of the Address Queue Logic.

FIG. 5 is a block diagram of the Address Queue Logic 255. As discussed above, this logic receives command and control information via Address/function Interface 220A from POD 120A. Because in a given period of time the Address/function Interface 220A is capable of transferring more requests than may be handled by Data Interface 210A, it is highly probable that the Address Queue Logic 255 will receive the address and control information for a given request before, or at the same time as, the POD Data Queue 245 receives any associated request data. The discussion which immediately follows therefore assumes that address and control information for a request is provided on Address/function Interface 220A before the associated data signals are provided on the Data Interface 210A. The special-case situation in which data is received by POD Data Queue 245 prior to the associated address information being received within Address Queue Logic 255 is explained later.

The circuit of FIG. 5 includes two queues, each having associated control logic. These queues are shown as Message Queue Logic 505 and Store/Fetch Queue Logic 510. Message Queue Logic 505 queues the address and control information associated with message requests from POD 120A. Store/Fetch Queue Logic 510 queues all other requests from POD 120A that are not message requests, including requests to store and to fetch data from MSU 110A, or to return data to another POD. Both the Message Queue Logic 505 and Store/Fetch Queue Logic 510 receive A/F Lines 302 and POD Request Signal 304 (included in Address/function Interface 220A). Both the Message Queue Logic and Store/Fetch Queue Logic also receive Decoded Address/Function (A/F) Signals 515. Decoded A/F Signals 515 are generated by Decoder 520, which decodes selected ones of the A/F Lines 302 when POD Request Signal 304 is asserted. The Decoded A/F Signals 515 indicate which type of request is being made by POD 120A, and include Message Indicator 525, which indicates that POD 120A is making a message-send request, and Store Data Indicator 530, which indicates that POD 120A is making a store-data request.

Message Indicator 525 and Store Data Indicator 530 are provided to Data Valid Routing Logic 535. Data Valid Routing Logic records the fact that a request has been made that is associated with data. Since the Address/function Interface 220A and Data Interface 210A operate independently, the data signals for a given request may be provided much later than the associated address and control information which has already been stored within either the Message Queue Logic 505 or the Store/Fetch Queue Logic 510. Eventually, however, the data which is associated with the previously received message-send or store-data request will be provided by the POD 120A to the MSU 110A. When this occurs, the MSU Data Control 334 provides the POD Data Queue 245 with the Data Request Signal on the interface shown as Control Lines 260, and the POD Data Queue captures the data signals provided by the POD on Data Signal Lines 308. MSU Data Control 334 also sends Data Request Signal 310, and other control signals to be discussed below, to the Address Queue Logic 255.

Within Address Queue Logic 255, Data Request Signal 310 is forwarded on Line 260 and 260C to Data Valid Routing Logic 535. As discussed above, the Data Valid Routing Logic 535 records the presence of all message-send or a store-data requests waiting for associated data. The Data Valid Routing Logic 535 determines whether the received Data Request Signal is associated with a pending message-send request or a pending store-data request. The Data Valid Routing Logic 535 then asserts either the Message Data Valid Signal 540, or the Store Data Valid Signal 545, respectively. The Message Queue Logic 505 receives the Message Data Valid Signal 540, and matches the received signal with a particular one of the pending message requests in a manner to be discussed below. This allows the matched one of the requests to become eligible for further processing. When the request is selected for processing, Message Queue Logic provides the associated command and control information on Line 263, where it is provided to Control Logic 265 in a manner to be discussed below.

In a similar manner, the Store/Fetch Queue Logic 510 receives the Store Data Valid Signal 545, and matches the signal with a particular one of the pending store-data requests. The matched one of the pending store-data requests becomes eligible for further processing. The request will eventually be selected for processing, and the command and control information associated with the request will be selected from Store/Fetch Queue Logic 510, and provided to Control Logic 265 via Line 262 in a manner to be discussed below.

The Message Queue Logic 505 and the Store/Fetch Queue Logic 510 also receive Data Pointer Signals on Line 260B. These signals are provided by the MSU Data Control 334 as part of Control Lines 260 along with the Data Request Signal 310. When data is stored within POD Data Queue 245, Data Pointer Signals on Line 260B are generated to indicate the addressable location within POD Data Queue 245 of the stored data signals. Data Pointer Signals are used to associate the command and control signals stored within either the Message Queue Logic 505 or the Store/Fetch Queue Logic 510 with the later-received data signals for the same request, as will be described below.

Figure 6:
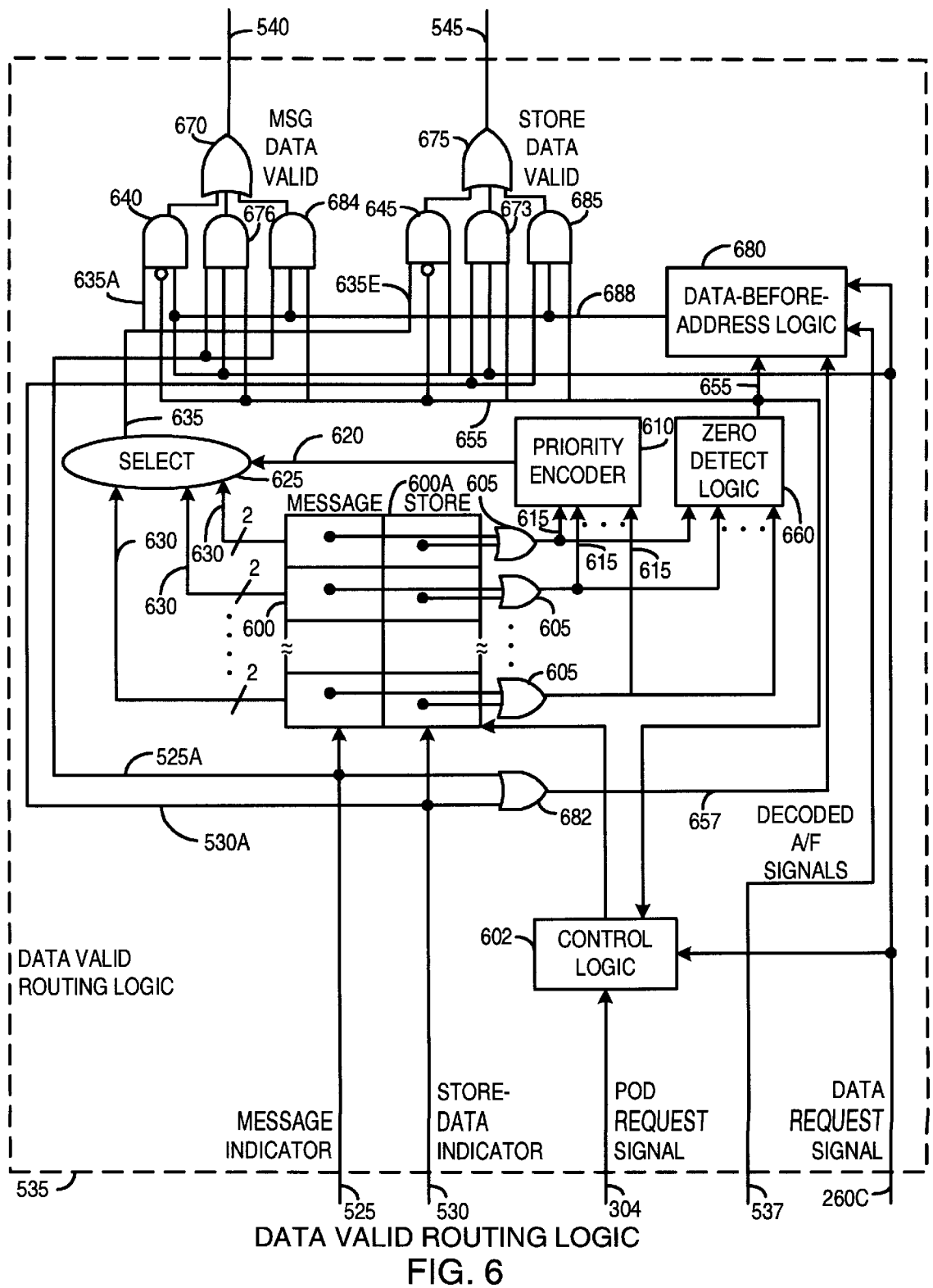
FIG. 6 is a block diagram of one embodiment of the Data Valid Routing Logic.

FIG. 6 is a block diagram of the Data Valid Routing Logic 535. The function of this logic is to route a data valid indication as indicated by the assertion of Data Request Signal 310 to either Message Queue Logic 505 or Store/Fetch Queue Logic 510. In one embodiment, this routing occurs to logic structures which are located within the same memory unit, although one skilled in the art will appreciate that this need not be the case.

There are three logical paths through the Data Valid Routing Logic 535, depending on the relationship between address and data transfers for the associated request. In the first case, an address is received prior to the associated data signals. In the second case, an address is received simultaneously with the associated data signals. Finally, in the third case, address signals are transferred after the associated data signals.

In the first case, Message Indicator 525 or Store Data Indicator 530 is received before assertion of Data Request Signal on Line 260A. The reception of the indicator will be recorded in the first rank of the Indicator Storage Device 600. The Indicator Storage device has a predetermined number of ranks, each of which is two bits wide, and each provides an indication of either a pending message-send or store-data request. Therefore, within each rank, at most only one bit is set. The setting of a bit within Indicator Storage Device 600 is controlled by Control Logic 602, which enables Indicator Storage Device to be written when the POD Request Signal 304 is asserted. Any previously-stored indicators in other ranks within Indicator Storage Device 600 will advance one rank. Thus, the reception of the indicators is recorded in a time-ordered fashion, with the indicators representing the oldest requests being stored nearest the top of the Indicator Storage Device 600 (that is, closest to the rank shown as Rank600A). Each rank within Indicator Storage Device 600 is associated with, at most, one request. That is, within each two-bit rank, each rank will record, at most, the assertion of Message Indicator 525, or Store Data Indicator 530. In one embodiment, Indicator Storage Device 600 includes 16 ranks, and is therefore capable of recording 16 requests.

As discussed above, the POD 120A is required to send any data signals via Data Interface 210A in the same order as previously-provided address and control signals were provided on Address/function Interface 220A. Therefore, it is guaranteed that the received Data Request Signal on Line 260A may be matched with the indicator which has been stored within Indicator Storage Device 600 the longest.

In this first case, a latter-received Data Request Signal on Line 260A is matched with the indicator which has been stored the longest using OR gates 605 and Priority Encoder 610. Each of the OR gates 605 receives two stored signals from a given rank within Indicator Storage Device 600, each representing the reception of the Message Indicator 525, or the Store Data Indicator 530. Each OR gate will indicate the presence of either of the associated stored signals by driving an associated one of Lines 615 to Priority Encode 610. Priority Encoder receives all of the signals on Lines 615, and generates encoded signals shown on Line 620 to Selector 625. The encoded signals on Line 620 cause Selector 625 to select from the Indicator Storage Device 600 the rank which includes the signal representing the oldest pending request. The signals stored within the oldest rank are received by Selector 625 on associated ones of Lines 630, and are gated to Line 635.

Line 635 includes the signal for representing the reception of Message Indicator 525, which is provided on Line 635A to AND gate 640. Line 635 further includes the signal for representing the reception of the Store Data Indicator 530, which is provided to AND gate 645 on Line 635B. At most, only one of the signals on Line 635A or 635B will be asserted.

Each of the AND gates 640 and 645 further receives Zero Detect Signal on Line 655. The Zero Detect Signal is asserted by Zero Detect Logic 660 only if the Indicator Storage Device 600 does not contain any valid pending requests as is detected by OR gates 605. In this first example, Indicator Storage Device 600 will contain at least one valid pending request by virtue of the fact that the address signals were provided prior to the data signals. Therefore the Zero Detect Signal on Line 655 is de-asserted at the time the Data Request Signal is received on Line 260A. This allows one of AND Gates 640 or 645 to route the oldest pending valid indicator to OR Gate 670 or 675, respectively, which in turn drives Message Data Valid Signal 540 for a message request, or Store Data Valid Signal 545 or a store data request.

In case two, the POD Request Signal 304 is provided substantially simultaneously with Data Request Signal 310 for a given request. Since the POD 120A is always required to send data signals via Data Interface 210A in the same order as POD 120A sends associated address and control information via Address Interface 220A, sending address, control, and data signals for a given request together at the same time implies that no pending requests will be stored within Indicator Storage Device 600. In these cases, by-pass paths are used. That is, Message Indicator 525 is provided to AND Gate 676 on by-pass path shown on Line 525A. Since Indicator Storage Device 600 is empty, Zero Detect Signal on Line 655 is provided to AND Gate 676. Therefore, Message Data Valid Signal 540 is asserted upon the reception of the Data Request Signal on Line 260A. Similarly, Store Data Indicator 530 is provided to AND Gate 678 on by-pass path shown on Line 530A. AND Gate 678 receives asserted Zero Detect Signal and Data Request Signal to cause Store Data Valid Signal 545 to be asserted.

As stated above, Address/function and Data Interfaces operate almost completely independently. In some situations, however, it is required that the Data Request Signal 310 be asserted at the same time as, or later than, the associated POD Request Signal 304. This timing constraint is a design choice made to simplify control logic. However, this required timing relationship is not considered to pose a limitation, since the Address/function Interface 220A is capable of servicing significantly more address requests in a given period of time than is the Data Interface 210A. As such, the required ordering of transfers, that is, address before, or at the same time as, data, will almost invariably occur by default. These situations are governed by the first and second cases, respectively, discussed above. The Data Request Signal 310 will be asserted before the POD Request Signal 304 in those situations in which the MSU 110A is utilizing A/F Signals to transfer address and function information to POD 120A at the same time as the POD is prepared to initiate a request associated with data signals to the MSU. In another similar instance, the MSU has asserted Hold Signal 330 to the POD because its Address Queue 255 is full, but POD Data Queue 245 can still accept entries. In both of these situations, it is desirable to allow the POD to assert Data Request Signal 310 and to provide Data Signal Lines 308 to POD Data Queue 245 before the associated address is transferred on A/F Lines 302, since this will increase system throughput.

In the situations in which Data Request Signal 310 precedes POD Request Signal 302, Data Valid Routing Logic 535 operates according to the third case mentioned above. For these cases, Data-Before-Address (DBA) Logic 680, which is a logic sequencer, receives Data Request Signal 260A when no entries exist in Indicator Storage Device 600, and no message-send or store-data requests are currently available for processing. DBA Logic 680 detects this via the assertion of Zero Detect Signal on Line 655, and by the fact that OR gate 682 is not indicating the present of a currently valid Message Indicator 525 or Store-Data Indicator 530. DBA Logic holds the received data indication until the next Message Indicator 525 or Store-Data Indicator 530 is received. When this indicator is received, it is presented on by-pass path 525A or 530A to AND Gates 684 and 685, respectively. At this time, the DBA Sequences unblocks the data indication and drives Line 688 so that either Message Data Valid Signal 540 or the Store Data Valid Signal 545 is driven.

During the situations when the DBA Logic 680 is temporarily blocking the Data Request Signal, the next transfer operation that is performed by the POD must be the transfer of the address associated with the data. That is, the POD may not buffer another data transfer in POD Data Queue 245 before transferring the address associated with the blocked Data Request Signal. Moreover, the POD may not transfer a different address that is not associated with the pending data transfer. If either of these two operations occur while the DBA Logic is blocking the Data Request Signal, DBA Logic 650 detects an error. In response, DBA Logic logs the error, and appropriate fault handling is initiated. This fault handling is beyond the scope of this patent.

As discussed above, requiring the address signals to be provided before, or at the same time as, as data signals for some of the requests is a design choice made for simplification purposes. One skilled in the art will recognize that logic similar to that discussed above with respect to the Data Valid Routing Logic 535 and Store/Fetch Queue Logic 510 could be added to MCA 250 to allow multiple data requests to precede command requests associated with data. In other words, similar logic could be added to the MSU Data Control Logic 334 to make it possible for the Data Request Signal 310 to precede the associated POD Request Signal 304 in the same manner as is discussed above for the address-before-data situations. However, this would result in a design which is more logic intensive, and would not result in significantly more interface flexibility, since most situations in which it is desirable for data signals to precede address signals are provided for by the DBA Logic discussed above.

Figure 7:
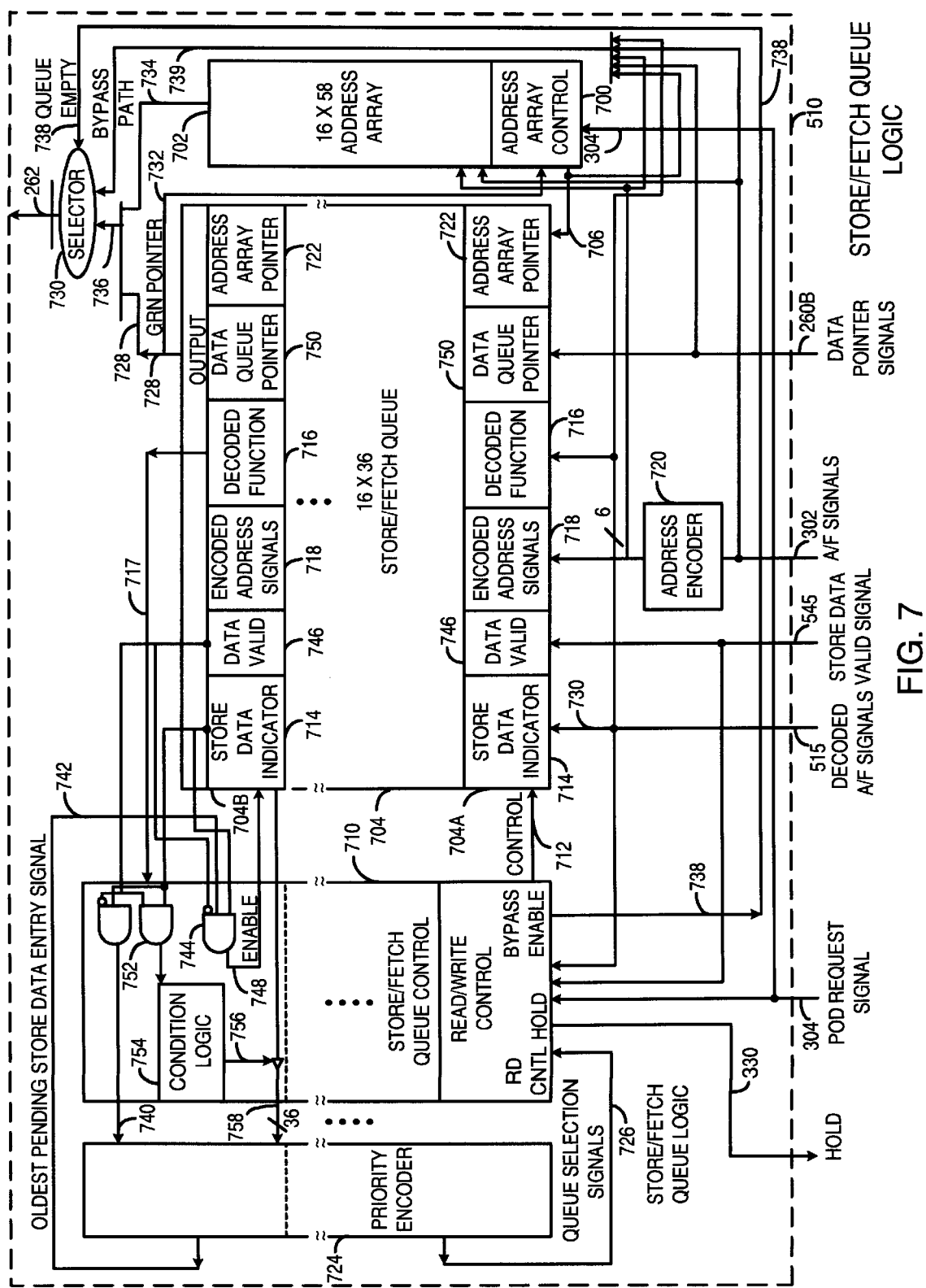
FIG. 7 is a block diagram of one embodiment of the Store/Fetch Queue Logic.

FIG. 7 is a block diagram of the Store/Fetch Queue Logic 510. Store/Fetch Queue Logic 510 includes logic which stores address and control information for all requests that are not message requests, including all types of store and fetch requests. One of the primary functions of the Store/Fetch Queue Logic includes storing a request, then determining when all conditions have been met for the request so that the request may be handled. For example, some requests may not be processed until associated data signals are received on the independent Data Interface 210A. The Store/Fetch Queue Logic 510 provides this functionality in a manner to be described below.

During a transfer on Address/function Interface 220A, POD 120A asserts POD Request Signal 304, and provides address and control information to Address Array Control 700 within Store/Fetch Queue Logic 510. In response, Address Array Control 700 causes the Address Array 702 to latch the 42 bits of address and control information which is provided by POD 120A on A/F Lines 302 during the two-cycle address transfer operation. The 42 bits of address and control information may be latched in any vacant location within Address Array 702. Address Array Control 700 determines the address of the vacant location within Address Array 702 which receives this address and control information, and provides this address to Store/Fetch Queue 704 as the Address Array Pointer 706. Additional information required for further processing of the POD request is also added to the Address Array at this time.

In one embodiment, Address Array 702 is a 16×58 Storage Array capable of storing address and control information for 16 different requests from POD 120A. MCA 230 asserts Hold Line 330 to POD 120A when the number of queued requests approaches this capacity to indicate that no new requests may be issued by the POD until a sufficient number of requests are removed from Store/Fetch Queue Logic 510. By issuing the Hold Line prior to the Store/Fetch Queue reaching maximum capacity, the MCA takes into consideration the possibility that one or more store-data requests are in transit at the time the Hold Line is asserted. This prevents overrun situations.

In addition to being provided to the Address Array Control 700, POD Request Signal 304 is also provided to Store/Fetch Queue Control 710, causing a signal on Line 712 to be generated to Store/Fetch Queue 704. The signal on Line 712 enables Store/Fetch Queue 704 to latch additional information regarding the received request. This information includes Address Array Pointer 706, Data Pointer signals 260B, decoded A/F signals 730, Store Data Valid 545 (if applicable and available), and other relevant information.

The Store/Fetch Queue in one embodiment is a 16×36 storage array. Information for a newly-received request (hereinafter, "Request Information") is latched into the first row within Store/Fetch Queue 704 shown as Row 704A, and any other stored Request Information associated with previously-received requests is advanced one row within Store/Fetch Queue. Therefore, within the Store/Fetch Queue, all Request Information is time-ordered. The Store/Fetch Queue of one embodiment is capable of storing Request Information for 16 different requests.

The Request Information includes Decoded A/F Signals 515 which describe the type of store or fetch operation being performed. The Decoded A/F Signals 515 include the Store Data Indicator 530, which is latched in Field 714. The purpose of the other Decoded Function Signals 515, which are shown stored in Field 716, is beyond the scope of the present invention and is not described further. The request information further includes Encoded Address Signals in Field 718. The Encoded Address Signals 718 are generated from the A/F Signals by Address Encoder 720, and include information which identifies a memory device or one of the PODs 120 as a target of the current request. Also latched into the Store/Fetch Queue is the Address Array Pointer 706, which points to a location within Address Array 702 that stores the associated 42 bits of address and control information obtained from the Address/function Interface 220A, plus 16 bits of supplemental information from Encoded Address Signals 718. The Address Array Pointer 706 is shown stored within Field 722 of Store/Fetch Queue 704.

While Request Information for a request is latched within Store/Fetch Queue 704, it is visible to Store/Fetch Queue Control 710. The Request Information is processed by the Store/Fetch Queue Control 710 to determine if the associated request is eligible for processing. For each type of request, as indicated by the Decoded Function 716 on Line 717, a predetermined set of conditions must be met before the request is eligible for processing. These conditions are largely beyond the scope of this Application, however, one of the conditions involving those requests associated with data signals will be discussed below. Once the Store/Fetch Queue Control 710 has determined that all conditions associated with a given request are met, the Request Information for that request is provided to the Priority Encoder 724, which prioritizes and schedules the request for processing based on request type as indicated by the Decoded Function 716, the availability of the target device as indicated by the Encoded Address Signals in Field 718, and the age of the pending request. The request which is determined by Priority Encoder 724 to be of the highest priority, and which is targeted for an available device, is selected using Queue Selection Signals 726.

The assertion of Queue Selection Signals 726 causes Store/Fetch Queue Control 710 to generate read control signals on Line 712, allowing a selected one of the rows associated with the highest priority request to be read from Store/Fetch Queue 704. The selected request information is provided by Store/Fetch Queue 704 on Lines 728 to Selector 730. Ones of the signals shown on Line 728 include the Address Array Pointer, which is provided on Line 732 to Address Array Control 700, thereby causing Address Array Control to read the associated 58 bits of address, control, and supplemental information from Address Array 702 onto Line 734. All information on Line 734 is merged with the request information on Line 728 to form a Request Packet on Line 736. Since in this example, the Store/Fetch Queue was not empty, the Bypass Enable Signal 738 is not being asserted by Store/Fetch Queue Control 710, and therefore Selector 730 routes the request packet on Line 736 to the nets shown on Line 262.

If the Store/Fetch Queue is empty when Store Fetch Queue Logic receives a request, and the request is not associated with any unsatisfied conditions, as determined by Store/Fetch Queue Control 710, the Bypass Enable Signal 738 is asserted, allowing the A/F Signals on Line 302 and other Request Information to be selected on By-pass Path 739. The Bypass Enable Signal is also asserted to allow requests associated with immediately-available resources to be provided directly to the Selector 730 if no previous requests are queued which are targeted for that same available resource. This saves time in processing the request. After the request packet is selected by Selector 730, it is provided to Control Logic 365 via Line 262.

The above description involves the general operation of the Store/Fetch Queue Logic 510 as it relates to any request, including those requests such as fetches which are not associated with data. The following discussion relates to the processing by the Store/Fetch Queue Logic 510 of store-data requests. This description assumes that POD 120A is providing the address and control information before the data signals.

When a store-data request is provided to Store/Fetch Queue Logic 510, information regarding the request is latched into the Store/Fetch Queue 704 in the manner described above if the Store/Fetch Queue is not already full. The Store Data Indicator 730 is latched into Field 714 of Store/Fetch Queue, indicating that this request is associated with data. Since the request is associated with data, the Store/Fetch Queue Control 710 will determine that the associated request information may not be provided to the Priority Encoder 724 until the Store Data Valid Signal 545 for that request is provided by Data Valid Routing Logic 535. In other words, for a store-data request, one of the conditions which makes the request eligible for processing is the reception of the associated data. It will be remembered that since the Address/function Interface 220A and the Data Interface 210A operate independently, Store/Fetch Queue 704 could receive many requests between the time a particular store-data request is received and the time the associated data signals are received by MDA 230.

As stated above, the matching of address and control information to later-arriving data is performed based on the assumption that for those requests associated with data, POD 120A is required to send address and command information in the same order as the associated data signals are (subsequently) transferred. By maintaining requests in a time order within the Store/Fetch Queue 704, the Store/Fetch Queue Control 710 is able to match a received Store Data Valid Signal 545 with a pending store-data request.

Requests are maintained in the Store/Fetch Queue 704 in a time order by storing newly-arriving requests in the first row shown as Row 704A, and advancing all other stored requests one row. It will be appreciated that requests are not necessarily processed in a first-in first-out fashion since processing of requests depends on all conditions having been met for that request. For example, a fetch request may become eligible for processing before data arrives for earlier-received store request, and therefore the fetch request will be processed first. Because request processing does not necessarily occur on a first-in, first-out basis, a request which is stored between two other valid requests within the Store/Fetch Queue 704 may be removed for processing, leaving a vacant row. In this instance, a newly arriving request is stored in Row 704A, and other requests bubble forward to fill the vacancy. When the Store/Fetch Queue is nearing capacity, the Address Hold Signal 330 is asserted indicating that POD 120A is not to send further requests until appropriate queue space is again made available.

Store/Fetch Queue Control 710 includes dedicated logic associated with each row in the Store/Fetch Queue that determines whether the signals stored within the associated row are eligible for processing by Priority Encoder 724. FIG. 7 shows logic for Row 704B that is used to match a store-data request with a later-received Store Data Valid Signal 545. It will be understood that logic similar to that shown for Row 704B is associated with each row within Store/Fetch Queue 704. One skilled in the art will recognized that Store/Fetch Queue Control 710 could also include logic for each row in Store/Fetch Queue for determining whether other conditions associated with other types of requests have been met.

Store/Fetch Queue Control records the presence of valid pending store data requests within the Store/Fetch Queue 704 by generating a Valid Pending Store Data Indicator for a respective row within the Store/Fetch Queue if the Store Data Indicator is asserted for that row and the Data Valid Indicator is not asserted for that row. Valid Pending Store Data Indicator 740 is shown for row 704B, but similar Valid Pending Store Data Indicators exist for each of the rows of the Store/Fetch Queue. Valid Pending Store Data Indicator 740 is provided to Priority Encoder 724 to indicate that a valid pending store data request is stored within the associated row in the Store/Fetch Queue. Priority Encoder 724 determines which row contains the oldest valid pending store data request and provides an Oldest Pending Store Data Entry Signal 742 to the associated row logic within Store/Fetch Queue Control 710. Oldest Pending Store Data Entry Signal 742 is the signal associated with Row 704B, but similar signals exist for each row in Store/Fetch Queue 704. Oldest Pending Store Data Entry Signal 742 is received by AND Gate 744, which also receives the Store Data Indicator from Field 714, and the Data Valid Indicator from Field 746. AND gate 744 asserts a signal on Line 748 if the associated Row 704B contains the oldest pending store-data request. The oldest pending store-data request is the oldest request for which the Store Data Indicator is asserted, and for which the Data Valid Indicator has not yet been received.

When the POD 120A next provides data signals to the MDA 230, the data signals are latched within POD Data Queue 245. MSU Data Control 334 provides both the Data Request Signal and the Data Pointer Signals to Address Queue Logic 255 on Line 260. Data Valid Routing Logic 535 receives the Data Request Signal and generates Store Data Valid Signal 545, which is provided to both Store/Fetch Queue Control 710 and to Store/Fetch Queue 704. In response, Store/Fetch Queue Control 710 asserts control signals on Line 712 to enable Store/Fetch Queue to be written. Assuming the Oldest Pending Store Data Entry Signal on Line 748 for Row 704B is asserted, Row 704B is enabled to receive the Store Data Valid Signal in Field 746. Also at this time, the Data Pointer Signals on Line 260B are also stored within Field 750 of Row 704B. The Data Pointer Signals indicate the address within POD Data Queue 245 of the associated data signals. After the store operation, Row 704B contains pointer information in Fields 722 and 750 which indicates, for the associated store-data request, the location within Address Array 702 of the address and control information, and the location within POD Data Queue 245 of the associated data signals, respectively. In this manner, the circuitry associated with the enabling of a given row of Store/Fetch Queue 704 to receive and to store Data Pointer Signals serves as a correlation circuit to correlate address signals and independently transferred data signals for a given request.

After the Store Data Indicator of Field 714 and the Data Valid Indicator of Field 746 are set, AND Gate 752 provides a signal to Condition Logic 754 indicating that data is present for the associated request. As discussed above, Condition Logic 754 could also include logic for determining whether other conditions associated with the request have been met. When all conditions are met for the request, Condition Logic 754 provides a signal on Line 756 indicating the request is now eligible for processing. The signal on Line 756 enables the request information from Row 704B to be provided on Line 758 to Priority Encoder 724. Priority Encoder 724 thereafter schedules the request for processing based on request type indicated by Field 716, the availability of the requested resource as indicated by the Encoded Address Signals in Field 718, and the age of the request as indicated by the position of the row within Store/Fetch Queue 704.

When the request is selected for processing, the associated row is read from Store/Fetch Queue 704, the A/F signals and supplemental information are retrieved from Address Array 702, the signals are driven onto Line 262, and are provided to Control Logic 265 in the manner discussed above.

After receiving a store-data request from the Address Queue Logic 255, Control Logic 265 gates the Data Queue Pointer Signals from Field 750 onto Line 275. Data Queue Pointer Signals on Line 275 are provided to Data Queue Interconnect Logic 247. Crossbar Interconnect Logic uses the Data Queue Pointer Signals to read the associated data signals from the indicated address within POD Data Queue 245 or a similar queue structure. After the data signals are read from the queue, Control Logic 265 provides routing information on Line 275 to Data Queue Interconnect Logic 247 to route the associated data signals to the requested destination as indicated by the A/F Address Signals that are associated with the request. For a store-data request, the data signals are routed to the requested one of the MCLs 235A, 235B, 235C, or 235D on Lines 240A, 240B, 240C, or 240D, respectively, and the A/F signals are also provided to the requested one of the MCLs on Lines 270A, 270B, 270C, or 270D, respectively. For a message request or POD-to-POD return request, the data signals are routed to another one of the PODs via Data Interfaces 210E, 210J, or 210N.

The above description involves those cases in which address signals are provided prior to data signals for a given request. When those signals are provided substantially simultaneously be a POD to an MSU, the Bypass Path 739 may be used if Store/Fetch Queue Control 710 determines that this new store request meets the conditions to bypass the Store/Fetch Queue 704. Otherwise, the request is queued with both store data valid and data valid conditions set, and including the corresponding data queue pointer. Scheduling the request for further processing proceeds as discussed earlier.

Finally, in the case in which data signals are provided before address signals, DBA Logic 680 delays the generation of the Message Data Valid Indicator 540 or the Store Data Valid Indicator 545 in the manner discussed above. When the store data request is received, the DBA Logic 680 provides Store Data Valid Indicator to the Store/Fetch Queue Logic 510, and processing continues as described for the case in which the request and data are received simultaneously.

The above description involves the handling of store-data requests by the Store/Fetch Queue Logic 510. The Message Queue Logic 505 is similar in operation to the Store/Fetch Queue Logic 510. That is, the Message Queue Logic processes the Message Data Valid Signal 540 in a similar manner to that in which Store/Fetch Queue Logic 510 processes the Store Data Valid Signal 545. The Message Queue Logic request packet is available on FIG. 5 Line 263, and is forwarded to the Control Logic 265 via the interface on Line 263. The Message Queue Logic will therefore not be described further.

The Store/Fetch Queue Logic 510 therefore handles requests stored within it based on a priority scheme which takes into account, among other things, the length of time the request has been stored in the queue, the availability of the requested resource, and the availability of store data if required. That is, in one embodiment, a request will be removed from the Store/Fetch Queue Logic 510 for further processing when (1) it is the oldest request to an available destination resource; (2) it is the oldest request outstanding to that destination resource; and (3) accompanying store data has also been received, if required.

With the SMP environment and general operation of the Store/Fetch Queue 510 having been described, a more detailed description of the controllable request removal rate concept in accordance with the present invention is now provided. Generally, the invention provides programmable control of the removal of data transfer requests from queuing structures to destination resources such as memory. The invention provides for control of the rate at which requests are removed from a request queue, including a complete suspension of data transfers for a user-defined period. Control of request removal rates is dynamically configurable, allowing flexibility and ease of use. The present invention facilitates stress testing of both the requester and request receiver, and is available for system fine-tuning during normal (non-test) system execution as well as for extensive offline test execution.

In one example system in which the present invention is applicable, there are two types of destination resources; one associated with main storage (MSU), and another associated with the PODs. For the first type of request to main storage, the destination resource specified by the request identifies a particular one of the Memory Clusters 235 described in connection with FIG. 2. Within each Memory Cluster 235 are one or more independent address buses, each of which represent a destination resource.

Figure 8:
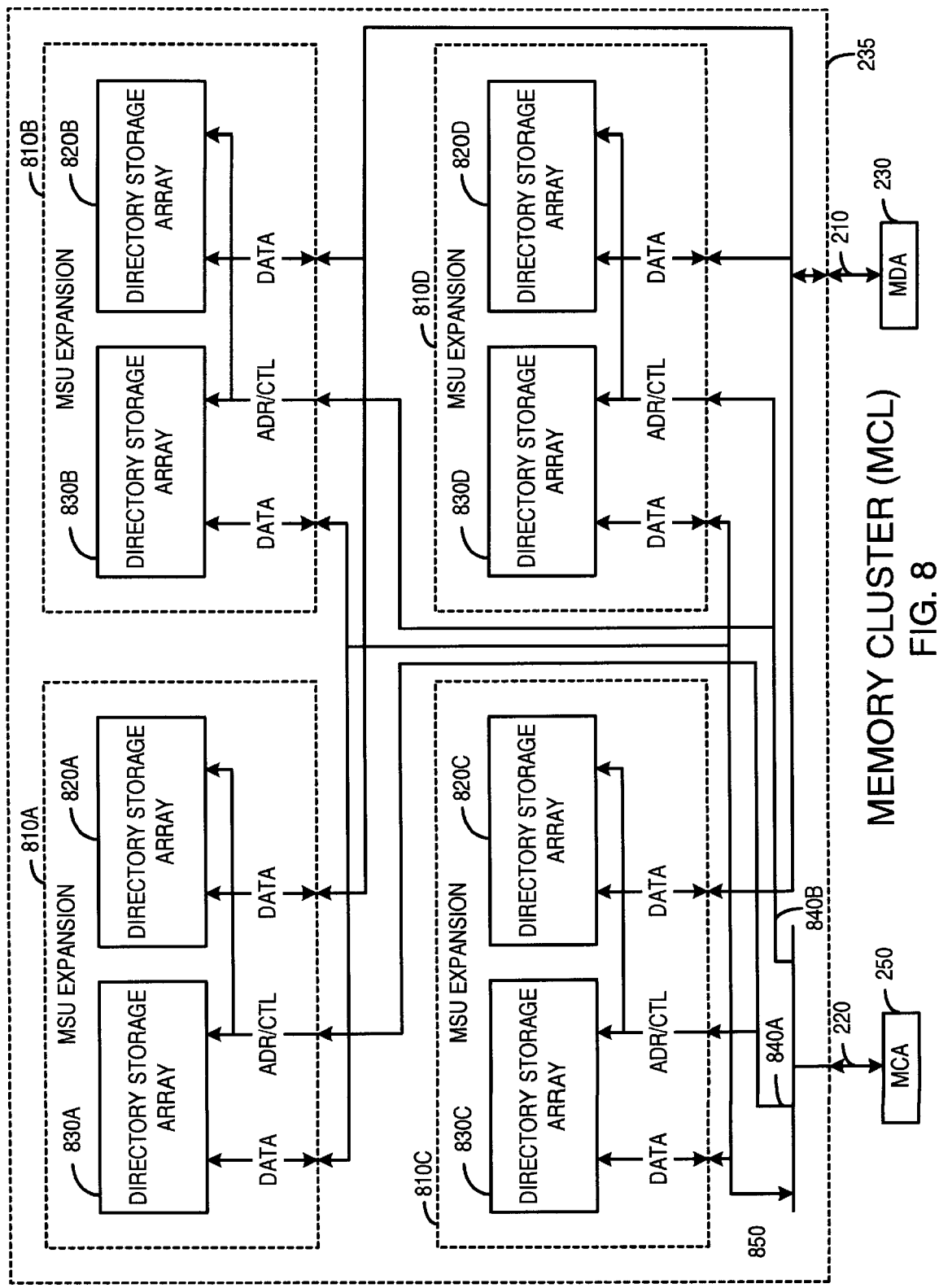
FIG. 8 is a block diagram of one embodiment of a Memory Cluster depicting the various destination resources contained therein.

FIG. 8 is a block diagram of one embodiment of a Memory Cluster 235 depicting the various destination resources therein. An MCL contains between one and four MSU Expansions 810A, 810B, 810C, and 810D as dictated by user needs. A minimally-populated MSU 110 will contain at least one MSU Expansion 810. Each MSU Expansion 810 includes two Dual In-line Memory Modules (DIMMs, not individually shown). Since a fully populated MSU 110 includes up to four MCLs 235, and a fully populated MCL includes up to four MSU Expansions, a fully populated MSU 110 includes up to 16 MSU Expansions 810 and 32 DIMMs. Each MSU Expansion 810 contains two arrays of logical storage, Data Storage Array 820 (shown as 820A, 820B, 820C, and 820D) and Directory Storage Array 830 (shown as 830A, 830B, 830C, and 830D.) MSU Expansion 810A includes Data Storage Array 820A and Directory Storage Array 830A, and so on.

Each of the Data Storage Arrays 820 interfaces to the bi-directional Data Bus 210 which also interfaces with the MDA 230. Each of the Data Storage Arrays further receives selected ones of the uni-directional Address Lines 220 driven by the MCA 250. As discussed above, each of the Address Lines 220 includes two Address Buses 840 (shown as 840A and 840B), one for each pair of MSU Expansions 810. Data Storage Arrays 820A and 820C receive Address Bus 840A, and Data Storage Arrays 820B and 820D receive Address Bus 840B. This dual address bus structure allows multiple memory transfer operations to be occurring simultaneously to each of the Data Storage Arrays within an MCL 235, thereby allowing the slower memory access rates to more closely match the data transfer rates achieved on Data Buses 210.

Each addressable storage location within the Directory Storage Arrays 830 contains directory state information bits and check bits for providing single-bit error correction and double-bit error detection on the directory state information. The directory state information includes the status bits used to maintain the directory coherency scheme discussed above. Each of the Directory Storage Arrays is coupled to one of the Address Buses 840 from the MCA 250. Directory Storage Arrays 830A and 830C are coupled to Address Bus 840A, and Directory Storage Arrays 830B and 830D are coupled to Address Bus 840B. Each of the Directory Storage Arrays further receive a bi-directional Directory Data Bus 850, which is included in Address Lines 220, and which is used to update the directory state information.

The Data Storage Arrays 820 provide the main memory for the SMP Platform. During a read of one of the Data Storage Arrays 820 by one of the PODs 120 or one of the I/O modules 140, address signals and control lines are presented to a selected MSU Expansion 810 in the timing sequence required by the commercially-available memories (SDRAMs in one embodiment) populating the MSU Expansions. The MSU Expansion is selected based on the request address. In one embodiment, the Data Storage Array 820 included within the selected MSU Expansion 810 provides the requested cache line during a series of four 128-bit data transfers, with one transfer occurring every 10 ns. After each of the transfers, each of the SDRAMs in the Data Storage Array 820 automatically increments the address internally in predetermined fashion. At the same time, the Directory Storage Array 830 included within the selected MSU Expansion 810 performs a read-modify-write operation. Directory state information associated with the addressed cache line is provided from the Directory Storage Array across the Directory Data Bus 850 to the MCA 250.

During a memory write operation, the MCA 250 drives Address Lines 840A, 840B to the one of the MSU Expansions 810 selected by the request address. The Address Lines are driven in the timing sequence required by the commercially-available SDRAMs populating the MSU Expansion 810. The MDA 230 then provides the 64 bytes of write data to the selected Data Storage Array 820 using the timing sequences required by the SDRAMs. Address incrementation occurs within the SDRAMs in a similar manner to that described above.

Therefore, each Memory Cluster 235 has two independent address buses that may be utilized simultaneously, as illustrated by Address Lines 840A and 840B. A store request to memory will specify a particular bus within an identified Memory Cluster 235, which is selected based on the requested address. This specified bus is therefore considered the destination resource.

Figure 9:
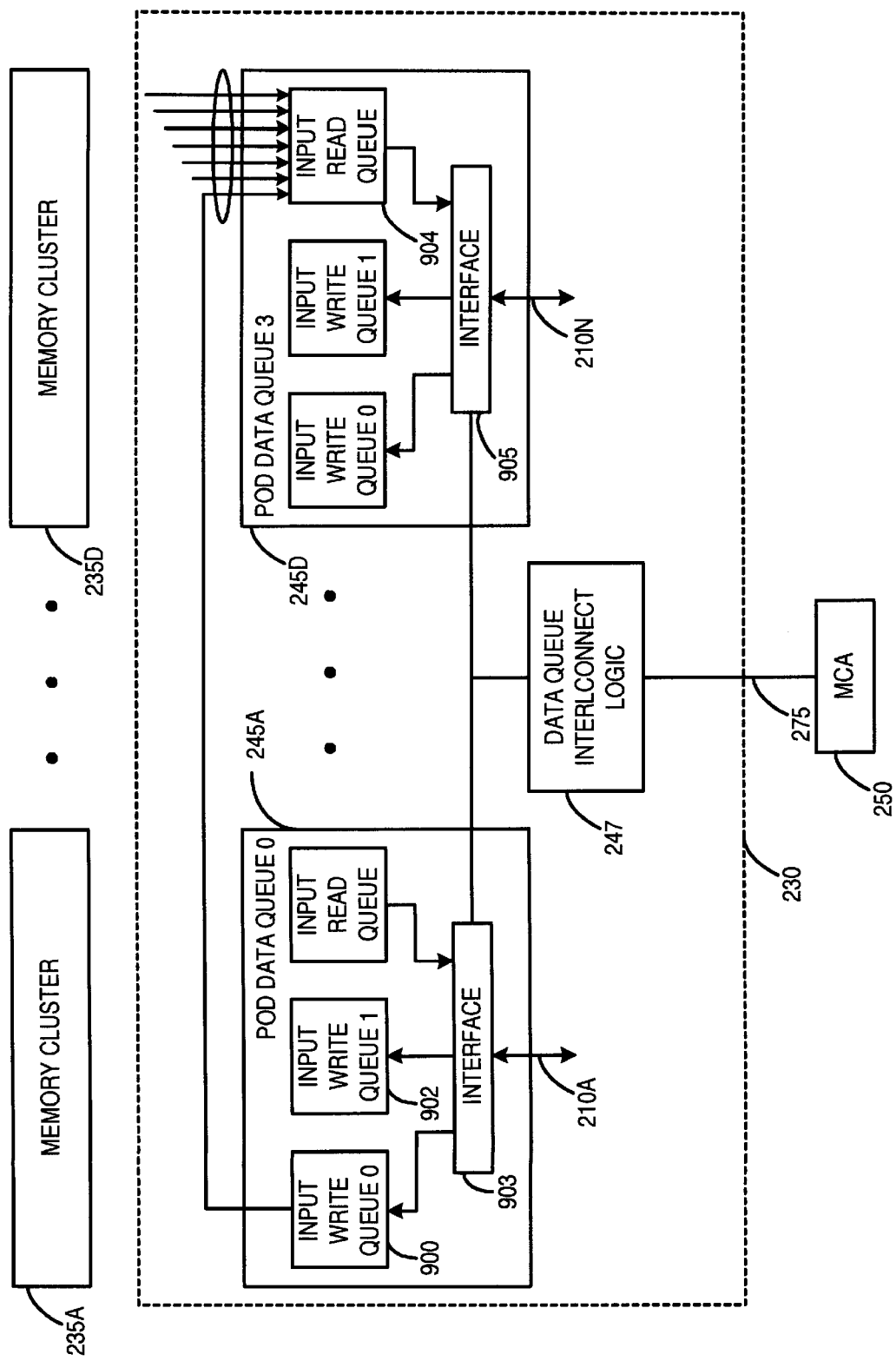
FIG. 9 is a block diagram of one embodiment of an MSU illustrating the availability of PODs being the resource destination.

A second type of destination resource can be seen in FIG. 9. FIG. 9 is a block diagram of one embodiment of an MSU 110 that illustrates the case where another POD is the destination, rather than the main storage being the destination. This type of request routes data directly from a POD to another POD or to itself. This typically occurs where a first POD has ownership of a cache line at a time when a second POD makes a request to memory for that same cache line. Since ownership of a cache line includes the right to modify that cache line, the first POD generally must return the data to memory so that the memory can forward the data to the second POD and maintain cache coherency. However, in such a situation, it is faster for the first POD to provide that data directly to the second POD. In this case, rather than providing the data to an MCL Data Queue 246 (see FIG. 2), the data is provided from an Input Write Queue of the source POD directly to the Output Read Queue of the destination POD, and the potentially updated data is written to memory sometime later. The data is still sent to memory since it is the controller for system memory coherency and therefore needs to know and record the status of all cache lines.

More specifically, the MDA 230 includes a plurality of POD Data Queues 245, illustrated in FIG. 9 as POD Data Queue-0 245A through POD Data Queue-3 245D. The POD Data Queues 245 receives data from the source POD via POD interface 210, shown as POD interface 210A through 210N to be consistent with FIG. 2. In this example, it is assumed that POD Data Queue-0 245A interfaces with the source POD, and POD Data Queue-3 235D interfaces with the destination POD. Data is written from the source POD to one of two input write queues associated with POD Data Queue-0 245A, shown as Input Write Queue-0 900 and Input Write Queue-1 902. The selection of which input write queue is determined by the Data Queue Interconnect Logic 247 which controls the Interface 903. In this example, when data is transferred to a different POD Data Queue during a POD-to-POD data transfer, the data is first read from Input Write Queue-0 900 onto a data interface to be passed to the Output Read Queue 904, again determined by the Data Queue Interconnect Logic 247 which controls the Interface 905. From the Output Read Queue 904, the data can be transferred to the requesting, or destination, POD. Therefore, from a data point of view, a POD input write queue such as Input Write Queue-0 900 and Input Write Queue-1 902 are considered data source resources, and an Output Read Queue such as Output Read Queue 904 is considered a data destination resource. However, since the data transfer requests queues are constructed as request slots dedicated to a particular "data source", then the Input Write Queues are destinations from a request point of view.

A centralized Data Crossbar Controller (DCC) within MCA 250 provides instructions to the Data Queue Interconnect Logic 247 for data transfers between POD input write queues to POD output read queues. In fact, the DCC can also provide instructions to the Data Queue Interconnect Logic 247 for data transfers between POD Data Queues 245 and MCL Data Queues 246. The DCC is generally a portion of the Control Logic 265 in FIG. 2, and is described in greater detail in copending U.S. patent application, Ser. No. 09/218, 377 entitled "Multi-Level Priority Control System And Method For Managing Concurrently Pending Data Transfer Requests", which is assigned to the assignee of the instant application, the contents of which are incorporated herein by reference.

Having defined at least two types of destination resources in the example SMP system, it can be appreciated that testing of such a system is complex, particularly where the system includes multiple MCLs per MSU, multiple MSUs, multiple PODs, etc. Testing of the system would ideally exercise the worst-case scenarios. For example, during normal system operation, some resources (e.g., memory) may temporarily become full with outstanding requests. When this occurs, response times may slow down, and the queues associated with memory requesters may also become full. Either the requester must be able to handle this situation so that overruns do not occur, or the system software must be adjusted to accommodate the situation. Further, during normal system operation, memory resources sometimes experience sudden utilization transitions. For example, memory resources may abruptly change from an idle state to being 100% busy. The design must be able to absorb the high volume of sudden traffic flow and respond to the requesters correctly. However, writing test programs to simulate these stress situations is very difficult and complex, and requires a thorough understanding of the hardware implementation to predict the direct effect on system hardware produced by test program stimulus. In order to overcome this problem, the configurable request flow control of the present invention was devised which facilitates request flow testing at both the source and destination. More particularly, one embodiment of the present invention operates as a queue throttling mechanism that controls the manner by which data transfer requests are removed from the Store/Fetch Queue Logic 510 described above. Programmable control of this queue throttling mechanism provides the ability, and flexibility, to simulate the system stress characteristics described above.

One embodiment of the present invention provides a programmable request flow control circuit coupled to the Store/Fetch Queue Logic 510. The control circuit can be configured to block the removal of particular ones or types of requests from the Store/Fetch Queue Logic 510. This "blocking" is performed on a destination resource basis, wherein the specified destinations are destination resources such as the previously described MCL address bus and/or DCC data transfer request queues. When the control circuit is configured to block one or more requests to a certain destination, those identified requests for that destination will not be removed from the Store/Fetch Queue Logic 510. This configurable request flow control can be used to simulate a variety of system stress conditions. For example, if requests to a particular destination resource are allowed to accumulate in the Store/Fetch Queue Logic 510, circuitry and other structures downstream from the Store/Fetch Queue Logic 510 can be stress tested by "unblocking" the requests to the particular destination resource which results in a potential flood of back-to-back requests besieging the particular destination resource. This stress testing can be simultaneously performed on selected combinations of interfaces to further test the design. For example, both address interfaces (e.g., Address Buses 840A, 840B) in a given MCL can be concurrently stress tested. Since an MCL has only one data bus (e.g., Data Bus 210; see FIG. 8), this testing would ensure that interleaving is being performed properly among the requests utilizing the data bus. In addition, by blocking access to a particular destination resource, the requester (e.g., a POD) is forced to accommodate the situation where certain types of requests are not being serviced. If the design is operating properly, overrun situations should not occur.

In one embodiment of the invention, multiple modes of operation are available to vary the time for which the flow of data transfer requests to a particular destination resource are blocked. One example of these modes of operation is provided in Table 1 below:

TABLE 1

|  | MODE 1 | MODE 2 | MODE 3 | MODE 4 |
|---|---|---|---|---|
| HALF-PERIOD | 2 CYCLES | 16 CYCLES | 128 CYCLES | 512 CYCLES |

As Table 1 illustrates, a first mode MODE 1 involves blocking the flow of requests to a particular destination resource for 2 clock cycles, then unblocked for 2 clock cycles, etc., such that it has a period of 4 clock cycles and a half-period of 2 clock cycles. MODE 2 has a half-period for blocking request flow of 16 cycles, MODE 3 has a half-period for blocking request flow of 128 cycles, and MODE 4 has a half-period for blocking request flow of 512 cycles. In one particular embodiment, the request flow is continuously blocked to build up requests for a particular device for an indefinite period of time as selected by the user. As will be readily apparent to those skilled in the art from the foregoing and ensuing description, different numbers of modes may be implemented as well as different test periods.

Figure 10:
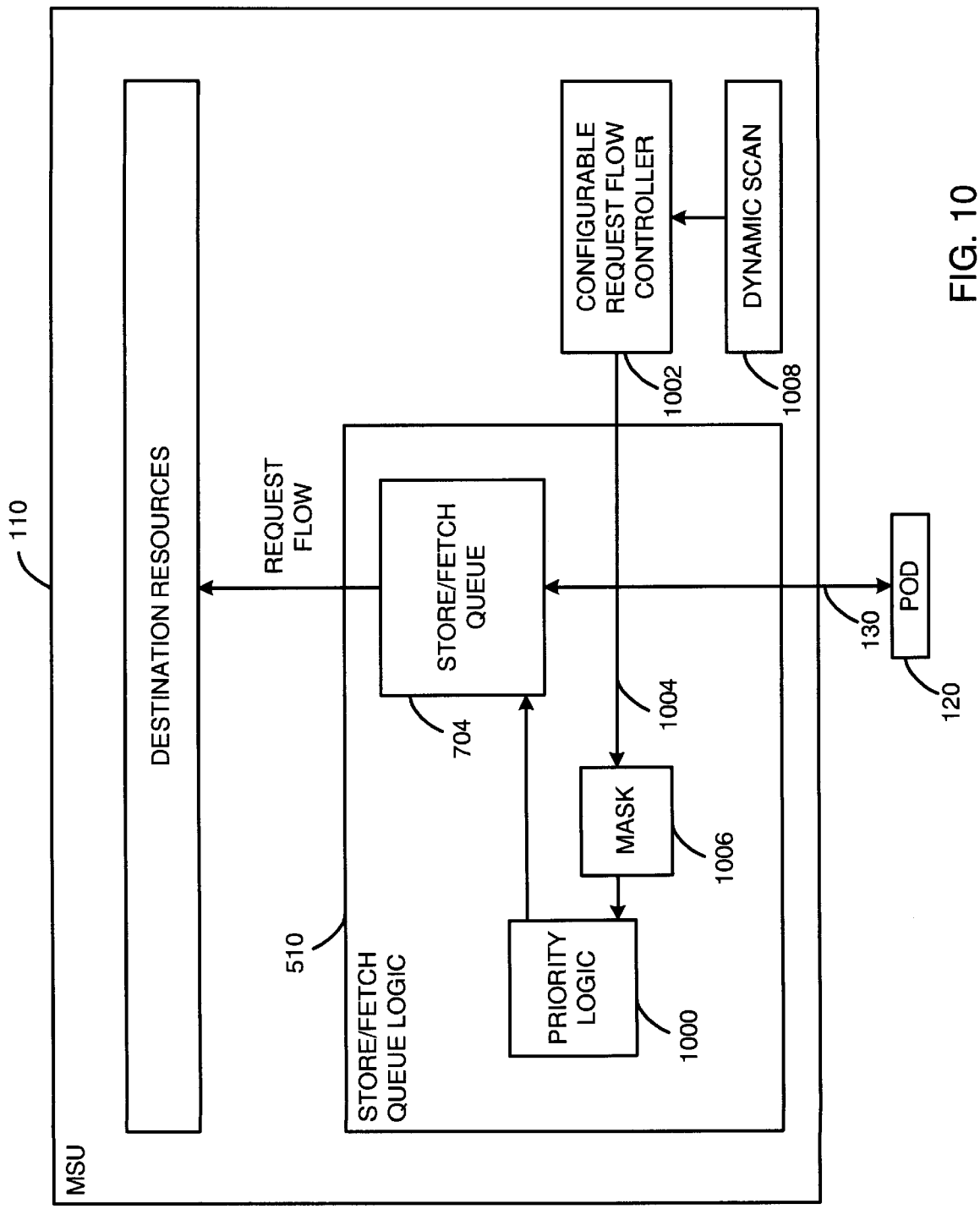
FIG. 10 is a block diagram illustrating one manner of configurably controlling the flow of data transfer requests to particular destination resources in accordance with the present invention.

FIG. 10 is a block diagram illustrating one manner in which the present invention can configurably control the flow of data transfer requests to particular destination resources. This embodiment is illustrated in connection with a particular MSU 110 which interfaces with a POD 120 via MSU Interface 130. MSU Interface 130 includes signals which ultimately connect to the Store/Fetch Queue 704 of the Store/Fetch Queue Logic 510 as was described in connection with FIGS. 5–7. Also described in connection with FIGS. 5–7 was the Priority Logic 1000, which generally includes the Store/Fetch Queue Control 710, the Priority Encoder 724, and related circuitry.

The present invention includes a Configurable Request Flow Controller 1002 coupled to the Store/Fetch Queue Logic 510. As will be described in greater detail in accordance with FIG. 11, the Configurable Request Flow Controller 1002 provides a plurality of Mask Enable bits shown on line 1004. In one embodiment, eight Mask Enable bits are provided to Mask Register 1006. The Mask Register is coupled to the Priority Logic 1000, and depending on the state of the Mask Enable bits, certain data transfer requests are blocked from being selected by the Priority Logic 1000 for removal from the Store/Fetch Queue 704. In this manner, certain data transfer requests can build up to a desired level in the Store/Fetch Queue 704 to effectuate the desired stress testing.

In order to designate particular tests to be performed, the Configurable Request Flow Controller 1002 is programmable. In one embodiment, this is accomplished using a Dynamic Scan circuit 1008. Generally, scan operations consider any digital circuit to be a collection of registers or flip-flops interconnected by combinatorial logic where test patterns are shifted into a large shift register organized from the storage elements of the circuit. A static scan operation is a scan operation where the unit is operated in the "shift mode" (i.e., by withholding the system clock excitations and turning on the shift scan control signals to the unit). This therefore requires stopping the system clock, or performing the scan prior to the time the system clock starts. A dynamic scan operation is a scan operation where scanning may occur even where the system clock is operating, thereby eliminating the need to stop the system clock. The Dynamic Scan circuit 1008 allows information to be shifted into this large shift register without having to stop the system clocks. That is, the test operations may be selectively enabled without the need to affect the state of the memory. In one embodiment of the invention, the circuit 1008 includes both static scan and dynamic scan capabilities. A static scan is used to set the modes, and dynamic scanning is used to enable the modes.

Figure 11:
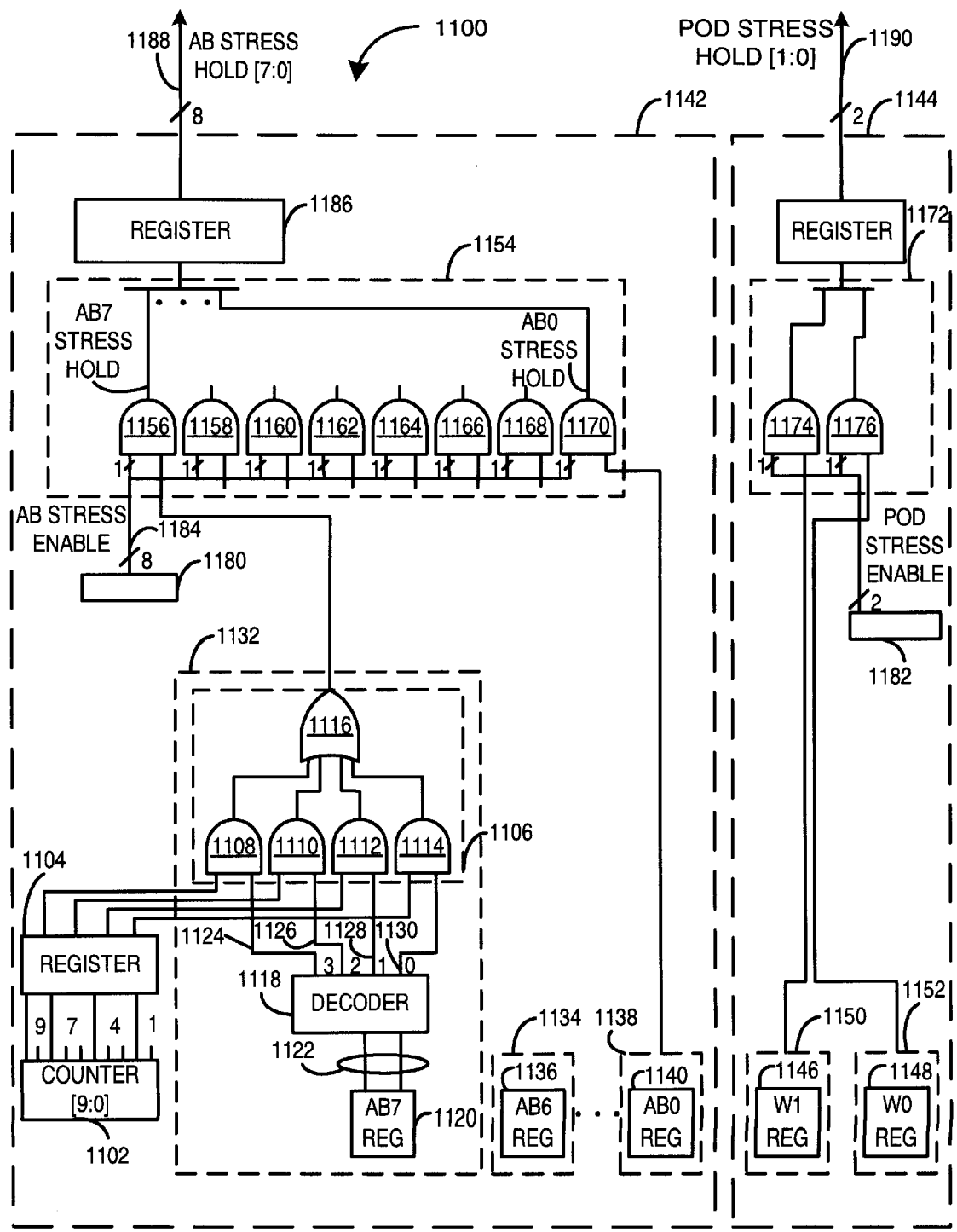
FIG. 11 is a schematic diagram illustrating one embodiment of a Configurable Request Flow Controller in accordance with the present invention.

FIG. 11 is a schematic diagram illustrating one embodiment of a Configurable Request Flow Controller 1100 in accordance with the present invention. In this embodiment, a free-running Counter 1102 is coupled to a Register 1104 which captures predetermined ones of the Counter 1102 outputs. In this embodiment, it will be assumed that the four modes identified in Table 1 above are to be implemented. To obtain 2, 16, 128 and 512 half-periods corresponding to MODES 1, 2, 3 and 4 respectively, a 10-bit [9:0] counter can be used. The use of Counter 1102 to obtain these cycle periods is illustrated in Table 2 below:

TABLE 2

| COUNTER BIT NUMBER | COUNTER OUTPUT HALF-PERIOD | CORRESPONDING MODE |
|---|---|---|
| 0 | $2^0 = 1$ | — |
| 1 | $2^1 = 2$ | MODE 1 |
| 2 | $2^2 = 4$ | — |
| 3 | $2^3 = 8$ | — |
| 4 | $2^4 = 16$ | MODE 2 |
| 5 | $2^5 = 32$ | — |
| 6 | $2^6 = 64$ | — |
| 7 | $2^7 = 128$ | MODE 3 |
| 8 | $2^8 = 256$ | — |
| 9 | $2^9 = 512$ | MODE 4 |

The Register 1104 captures counter bits 9, 7, 4 and 1 and provides these signals to a first Selection Rank 1106, which in this embodiment includes AND-Gates 1108, 1110, 1112 and 1114 which are fed into OR-Gate 1116. Each of the outputs of Register 1104 is fed into a different one of the AND-Gates in the first Selection Rank 1106. An input of each of the AND-Gates 1108, 1110, 1112, 1114 is also coupled to a Decoder 1118 that decodes the bits of a two-bit programmable register associated with each MCL 235. A two-bit programmable register is provided for each destination resource address bus within an MCL 235, and since there are two address buses within each MCL 235 there are up to eight address buses per MSU 110 since up to four MCLs 235 can be configured in a given MSU 110.

A first of the two address buses corresponding to a first MCL is identified in FIG. 11 as AB7 Register 1120. The AB7 Register 1120 represents the two-bit programmable register corresponding to Address Bus 7, where the eight address buses are identified as Address Bus 7. The AB7 Register 1120 provides two bits 1122 to the Decoder 1118 which in turn asserts one of its four outputs on lines 1124, 1126, 1128, 1130. Depending on which of the Decoder 1118 outputs is asserted, one of the waveforms originating from Counter 1102 will be selected by the OR-Gate 1116 for output from the AB7 Selection Circuit 1132. For example, where the AB7 Register 1120 is programmed to a binary value of 01, Decoder 1118 asserts a signal on line 1128 which enables the Counter 1102 bit 4 to pass through AND-Gate 1112 to OR-Gate 1116. Other values in the AB7 Register 1120 similarly enable other ones of the Counter 1102 output to be output from the AB7 Selection Circuit 1132. In other words, the contents of the AB7 Register 1120 identifies which mode is desired for testing Address Bus 7 of the corresponding MCL 235.

The first Selection Rank 1106 can alternatively include equivalent selection circuitry without departing from the scope and spirit of the invention. For example, rather than using the AND-Gates (1108, 1110, 1112, 1114), OR-Gate 1116, and Decoder 1118, the Register 1104 could alternatively be input to a multiplexing device controlled by the two-bit programmable register 1120.

A selection circuit is provided for each of the MCL Address Buses. For Example, the AB6 Selection Circuit 1134 working in connection with AB6 Register 1136 performs a similar function as was described in connection with the AB7 Selection Circuit 1132, but is directed to the Address Bus 6 destination resource. Each destination resource similarly includes a selection circuit, and the last such selection circuit is illustrated in FIG. 11 as the AB0 Selection Circuit 1138 which includes AB0 Register 1140. Each address bus (i.e., destination resource) therefore includes its own unique ABx Register to independently select a mode of operation for that particular destination resource. While each Selection Circuit (e.g., 1132, 1134, 1138) could have its own Register 1104 and Counter 1102, it is advantageous to use the Counter 1102 and Register 1104 for all of the destination resources, assuming of course that it is acceptable to choose from the available modes generated by the Counter 1102 and Register 1104.

Block 1142 represents the circuitry of the Configurable Request Flow Controller 1100 dedicated to the MCL Address Bus destination resources. However, as previously indicated, other destination resources may exist such as data queues associated with POD-to-POD data transfers. Block 1144 represents the circuitry of the Configurable Request Flow Controller 1100 dedicated to such destination resources. In this example, two more two-bit programmable registers are provided, one for each of the Input Write Queues (e.g., Input Write Queue-0 900; Input Write Queue-1 902 of FIG. 9) associated with a given POD. These additional programmable registers are labeled W1 Register 1146 and W0 Register 1148, and are associated with Selection Circuits 1150 and 1152 respectively. Selection Circuits 1150 and 1152 are analogous to Selection Circuits 1132 and 1134 through 1138.

Therefore, in the embodiment of FIG. 11, there is a total of ten programmable registers to control the flow of data transfer requests to a corresponding total of ten unique destination resources. Each of these programmable registers is coupled to a decoder and a first selection rank as was described in connection with Selection Circuit 1132.

In one embodiment, each of the two-bit programmable registers 1120, 1134 through 1138, 1150 and 1152 may be programmed via a scan-set register to enable one of the four modes discussed—particularly, blocking the removal of requests for 2, 16, 128 or 512 clock cycles at a time. Scan-set methods were discussed in connection with FIG. 10.

Referring again to Selection Circuit 1132, each AND-Gate 1108, 1110, 1112, 1114 of the first Selection Rank 1106 is coupled to OR-Gate 1116, which in turn is coupled to a second Selection Rank 1154. In the illustrated embodiment, the second Selection Rank 1154 includes a series of AND-Gates 1156, 1158, 1160, 1162, 1164, 1166, 1168 and 1170. Each of the AND-Gates in the second Selection Rank 1154 is coupled to the output of its respective Selection Circuit 1132, 1134, . . . 1138 of the MCL Block 1142. Similarly, in Block 1144, the output of each of the Selection Circuits 1150, 1152 is respectively coupled to AND-Gates 1174 and 1176 of a second Selection Rank 1172. Referring to Block 1142, each of the AND-Gates 1156–1170 in the second Selection Rank 1154 is enabled via a dynamically-scanned AB STRESS ENABLE bit for each AND-Gate from programmable Register 1180 which enables stress testing of any combination of the address buses (AB) within the MCLs 235. Analogously, with respect to Block 1144, each of the AND-Gates 1174, 1176 in the second Selection Rank 1172 is enabled via a distinct dynamically-scanned POD STRESS ENABLE bit from programmable Register 1182 which enables stress testing of any combination of the POD input write queues within the respective POD Data Queue (e.g., POD Data Queue-0 245A through POD Data Queue-3 245D of FIG. 9).

In one embodiment of the invention, rather than providing for individual AB STRESS ENABLE bits for each of the AND-Gates 1156–1170 and individual POD STRESS ENABLE bits for each AND-Gate 1174, 1176, a single AB STRESS ENABLE bit and a single POD STRESS ENABLE bit may be used to enable the entire second Selection Ranks 1154 and 1174.

When a STRESS ENABLE bit is asserted, i.e., AB STRESS ENABLE bit within Block 1142, the corresponding AND-Gate of the second Selection Rank is enabled to output the signal from its corresponding Selection Circuit. For example, where the AB7 STRESS ENABLE bit on line 1184 is asserted, the signal from Selection Circuit 1132 is provided to the Register 1186 via AND-Gate 1156. Each of the other Selection Circuits is also coupled to the Register 1186, but would not provide a "hold" signal as part of the AB STRESS HOLD [7:0] signals on line 1188 because their corresponding AND-Gates 1158–1170 are not enabled. The AB STRESS HOLD signals on line 1188 are provided to an eight-bit mask field in the Store/Fetch Queue Logic 510, such as Mask Register 1006 of FIG. 10.

Analogously, assertion of a POD STRESS ENABLE bit provides an asserted POD STRESS HOLD [1:0] signal on line 1190. The POD STRESS HOLD signals on line 1190 are provided to a two-bit mask field in the Store/Fetch Queue Logic 510, such as Mask Register 1006 of FIG. 10.

Figure 12:
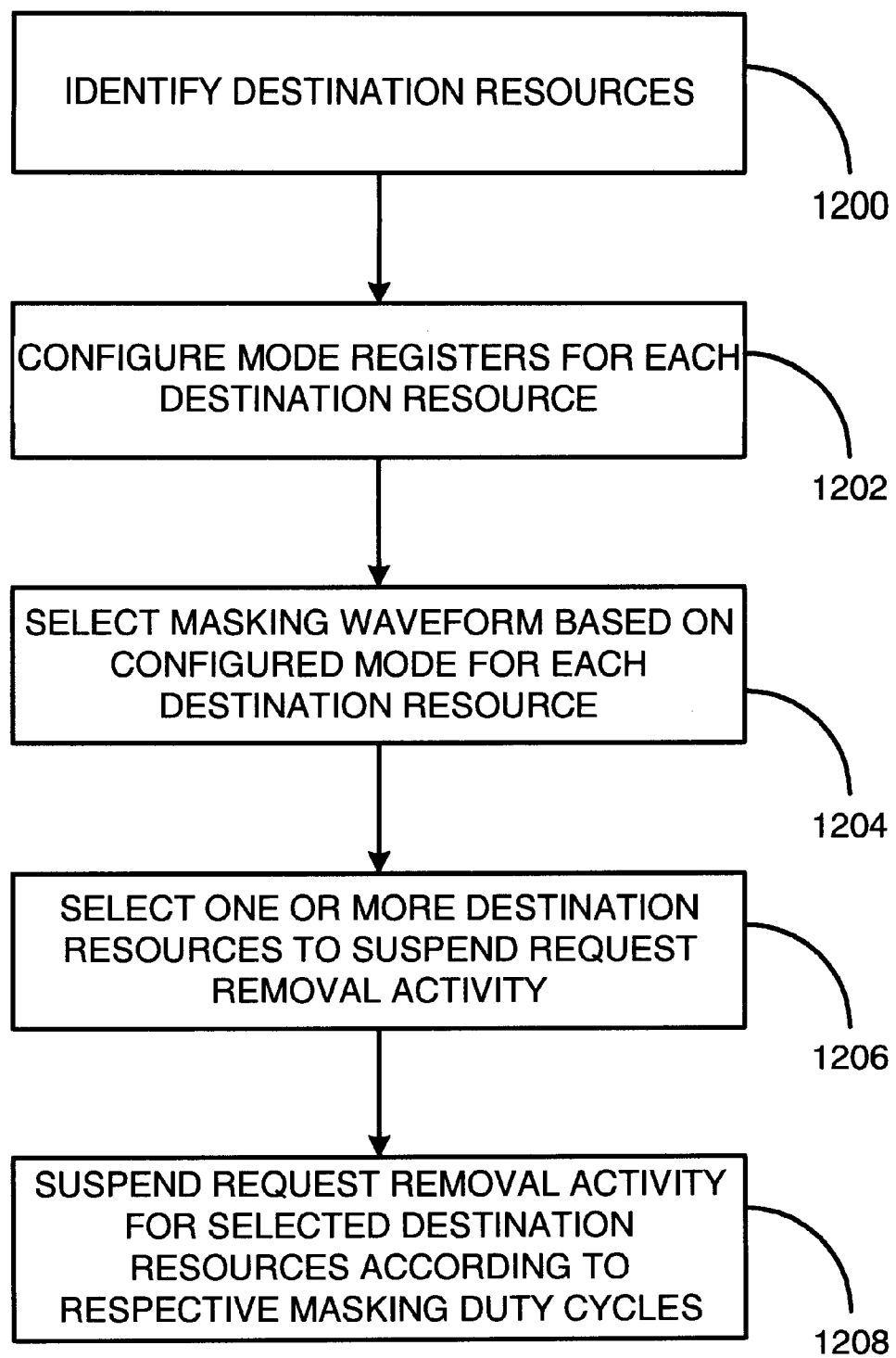
FIG. 12 is a flow diagram illustrating one embodiment of a method for programmably controlling the flow of data transfer requests in accordance with the present invention.

FIG. 12 is a flow diagram illustrating one embodiment of a method for programmably controlling the flow of data transfer requests in accordance with the present invention. The destination resources are identified 1200. FIGS. 8 and 9 illustrated the identification of various address bus and POD input queue destination resources. Mode registers are configured 1202 for each identified destination resource. The configured mode corresponds to the desired masking waveform, which is selected 1204 based on the configured mode for each destination resource. For example, MODE 1 in Tables 1 and 2 corresponds to a half-period of 2 clock cycles, and the mode register is therefore configured to represent MODE 1 (e.g., binary 00). The number of binary digits required to configure the mode registers depends on the number of available masking waveforms desired. For example, where 4 masking waveforms are desired, two binary digits will suffice (i.e., 00, 01, 10, 11). Where 5–8 masking waveforms are desired, three binary digits should be used, and so forth. The masking waveform is selected 1204 by selecting one of the generated masking waveforms using the mode register value, which was illustrated in FIG. 11 as the first Selection Rank 1106.

When the masking waveforms have been selected for each destination resource to be controlled, one or more destination resources are selected 1206 to have their respective request removal activities suspended. In the example of FIG. 11, this was accomplished using the second Selection Rank 1154.

Selection at the first and second Selection Ranks 1106 and 1154 can be on a fixed basis, or alternatively can be controlled using scan methodologies, such as static scan or dynamic scan methods. In a preferred embodiment, a static scan is used to allow selection of the mode, and dynamic scan is used to enable the modes to the destination resources to have request removal activity suspended. Therefore, selection at the second Selection Rank 1154 can be effected without requiring temporary suspension of the system clock.

Once selection at the first and second Selection Ranks has been effected, masking bits are generated which cause the request removal activity for the selected destination resources to be suspended 1208, in accordance with their respective masking waveforms. For those destination resources identified for suspension of request removal activity, data transfer requests stored in the Store/Fetch Queue 704 will be prohibited from being transferred, and will remain in the Store/Fetch Queue 704 until the masking waveform changes state at the ensuing half-period. When the masking waveform changes state, the data transfer requests will be enabled to be output from the Store/Fetch Queue 704. Depending on the waveform selected, it is possible that many of the suspended data transfer requests will be among the oldest pending data transfer requests, and will result in a flood of consecutive requests being delivered to the destination resources under test. This allows these destination resources and the queuing structures and other circuitry associated with these destination resources to be stress tested.

Figure 13:
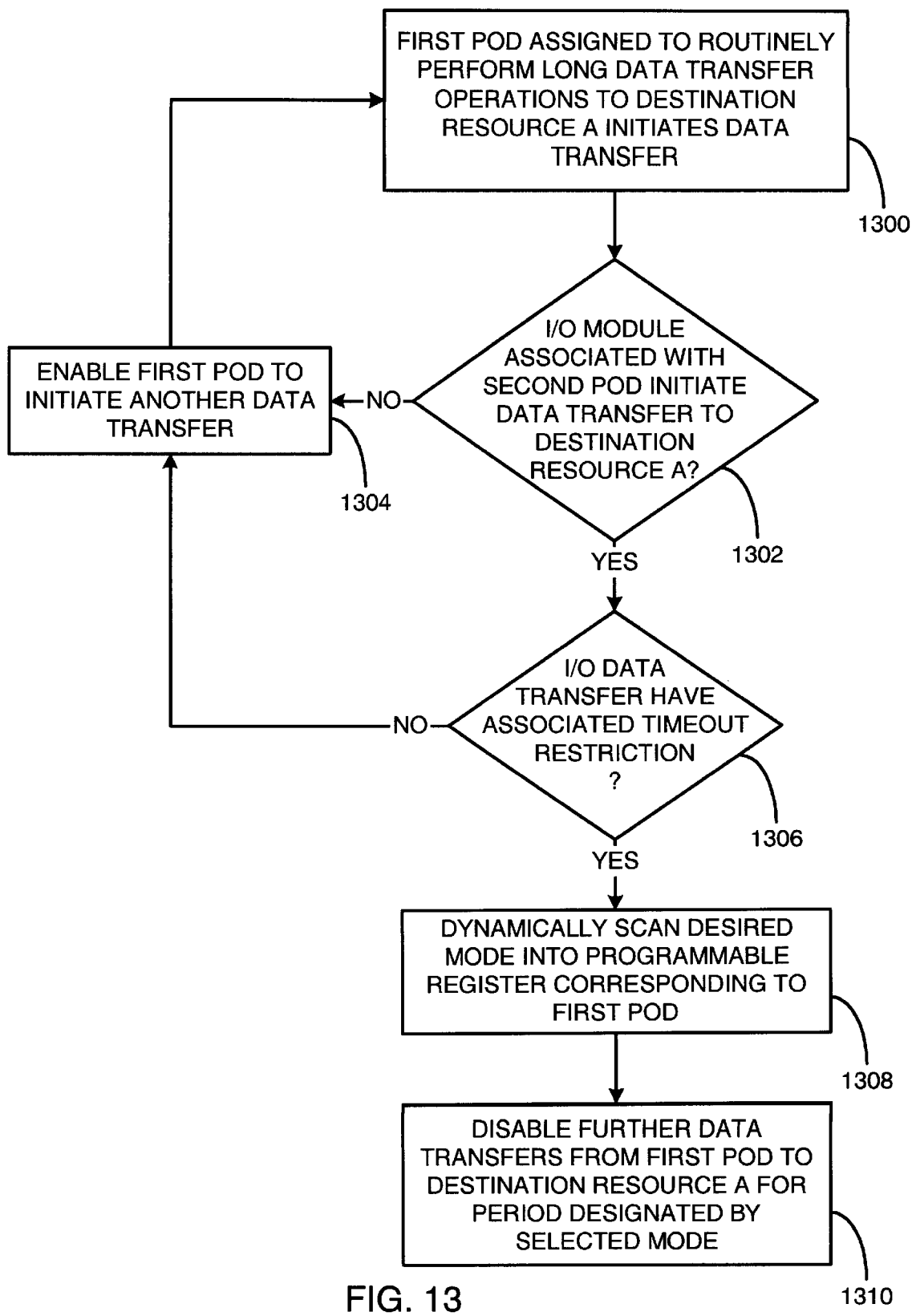
FIG. 13 is a flow diagram of an example procedure used during normal operation of the system using the principles of the present invention.

FIG. 13 is a flow diagram of a more detailed embodiment of a procedure that can be used during normal operation of the system using the principles of the present invention. In this example, the ability to dynamically configure the configuration registers allows certain modifications to be made to fine tune system performance during normal operation. Assume that a first POD is assigned to routinely perform long data transfer operations to a particular destination resource, such as destination resource A. This first POD initiates and carries out a data transfer as seen at block 1300. An I/O Module associated with a second POD may need to perform a data transfer to the same memory destination to which the first POD routinely performs long data transfers. Such an I/O Module was depicted in FIG. 1, such as I/O Module 140A. If the I/O Module associated with the second POD is not targeting the same destination resource (i.e., destination resource A) as the first POD as determined at block 1302, the first POD will continue to be enabled 1304 to initiate further data transfers, and will thereafter initiate those data transfers as seen at block 1300. If the I/O Module associated with the second POD is targeting destination resource A, it is determined whether the I/O Module data transfer has an associated timeout restriction as seen at block 1306. If not, the first POD again is enabled 1304 to initiate further data transfers.

However, if the I/O Module is targeting destination resource A, and has an associated timeout restriction, it may be desirable to block those long data transfers to the destination resource A initiated by the first POD. I/O operations often have associated timeout values such that if the operation is not carried out in a predetermined time, a timeout notification or error will occur. To prevent such an I/O timeout situation, the data transfers from the first POD to destination resource A can be temporarily suspended to allow the I/O transaction to transpire. This can be performed by dynamically scanning 1308 the desired mode into the appropriate programmable register corresponding to the first POD, the details of which were previously described. In this manner, further data transfers from the first POD to destination resource A are disabled 1310 for a period of time defined by the selected mode. For example, if the selected mode designated a 128 cycle half-period, data transfers from the first POD to destination resource A would be disabled for 128 clock cycles, then would be enabled for 128 clock cycles, then disabled for 128 clock cycles, and so on. Alternatively, data transfers from the first POD to destination resource A can be suspended indefinitely until the I/O transaction has completed. This type of system operation "tuning" can be performed without affecting other system operations, since the dynamic scan function can be performed without the need to suspend system clock operation.

Figure 14:
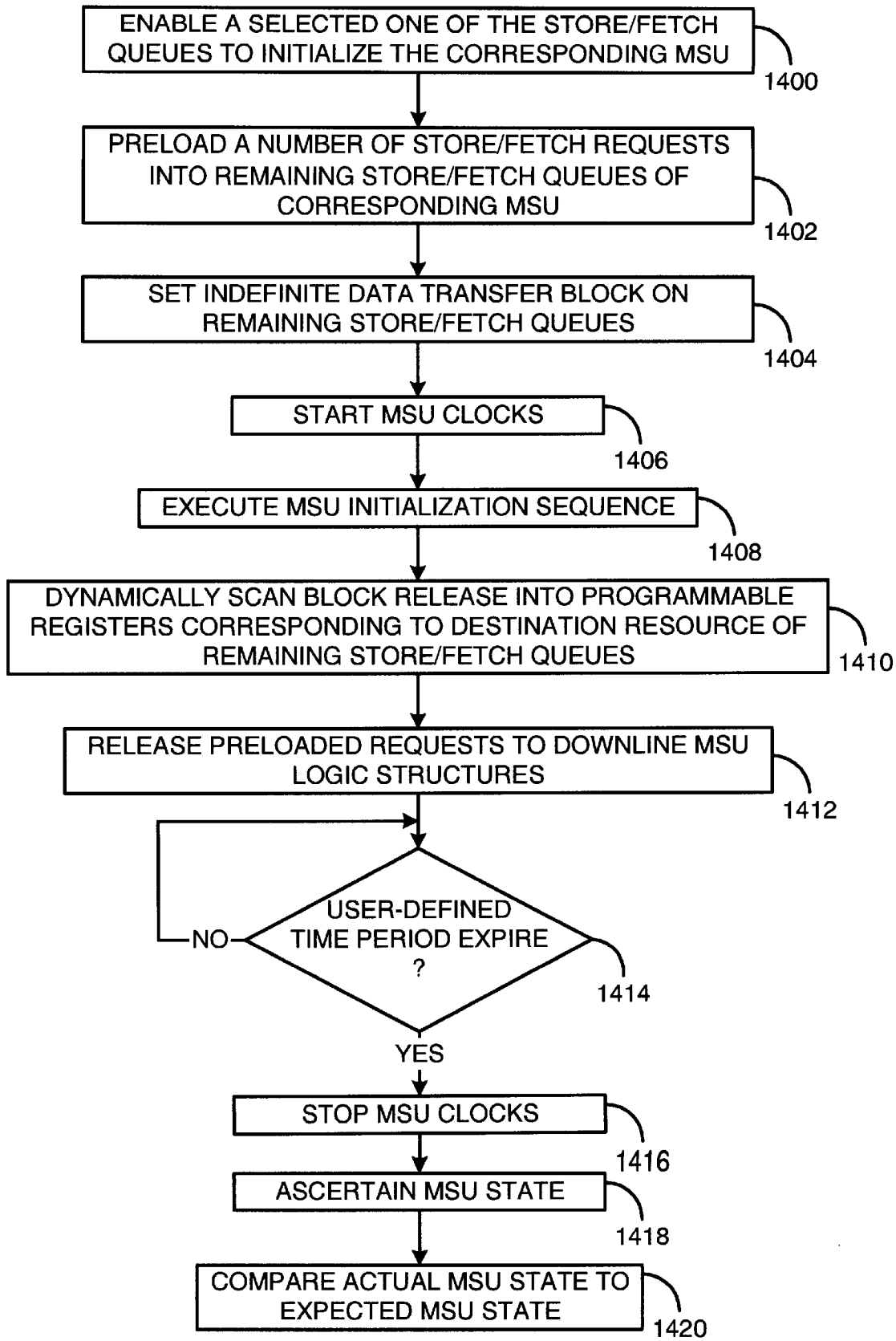
FIG. 14 is a flow diagram of an example procedure used during offline testing of the system using the principles of the present invention.

FIG. 14 is a flow diagram of a more detailed embodiment of a procedure that can be used during offline testing of the system using the principles of the present invention. A selected one of the four Store/Fetch Queues within the MCA 250 of the MSU 110 is enabled 1400 to initialize the MSU. A number of store/fetch requests are preloaded 1402 into the remaining three Store/Fetch Queues of the MSU. In one embodiment of the invention, this preloading is accomplished via scan-set methods. This initialization state for the remaining three Store/Fetch Queues also includes setting 1404 an indefinite data transfer block on these three Store/Fetch Queues. This is accomplished using the programmable registers as previously described.

When the three remaining Store/Fetch Queues have been preloaded with a number of store/fetch requests and have further been configured to suspend any output of the preloaded requests, the MSU clocks are started 1406. The MSU initialization sequence is executed 1408 using the selected one of the Store/Fetch Queues, and the preloaded requests in the remaining three Store/Fetch Queues are held in their respective store/fetch queues. Upon completion of initialization, the MSU signals completion to the system control process, and a block release is dynamically scanned 1410 into the programmable registers corresponding to the destination resource of the three Store/Fetch Queues holding the preloaded requests. The preloaded requests are then released 1412 to downline MSU logic structures.

After expiration of a user-defined time period as determined at block 1414, the MSU clocks are stopped 1416, and the MSU state is ascertained 1418. In one embodiment, this state is determined by scanning out the MSU state using scan-set methods. The resulting actual MSU state is then compared 1420 to expected MSU state information to determine the results of the preloaded requests.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A method for controlling the flow of data transfer requests from one or more request sources to one or more request destinations, wherein each data transfer request is a request for an addressed one of the request destinations to supply a data segment to a respective one of the request sources, the method comprising:

temporarily storing the data transfer requests from each of the request sources for future delivery to its addressed one of the request destinations;

enabling delivery of the stored data transfer requests to their corresponding addressed ones of the request destinations in accordance with a predetermined delivery priority scheme;

selectively suspending prioritization and delivery of identified ones of the stored data transfer requests for a user-defined period; and upon expiration of the user-defined period, enabling prioritization and delivery of both the identified ones and remaining ones of the stored data transfer requests in accordance with the predetermined delivery priority scheme.

2. The method of claim 1, wherein temporarily storing the data transfer requests comprises storing each of the data transfer requests in a queue.

3. The method of claim 1, wherein the predetermined delivery priority scheme prioritizes delivery of the stored data transfer requests based at least in part on the length of time each of the stored data transfer requests has been stored, and wherein the stored data transfer requests being stored the longest time are granted a higher delivery priority, whereby the suspended data transfer requests generally accumulate during the user-defined period of suspension.

4. The method of claim 3, wherein enabling prioritization and delivery of all data transfer requests upon expiration of the user-defined period comprises delivering a higher percentage of the suspended data transfer requests than the remaining ones of the stored data transfer requests due to the accumulation of the suspended data transfer requests which have been stored for a longer time than the remaining ones of the stored data transfer requests.

5. The method of claim 4, wherein the user-defined period is selected to accumulate enough of the suspended data transfer requests that upon expiration of the user-defined period, delivery of the data transfer requests is predominantly a delivery of the suspended data transfer requests.

6. The method of claim 1:

further comprising identifying those of the stored data transfer requests destined for a particular one of the request destinations for which data transfer activity is to be deferred; and wherein selectively suspending prioritization and delivery of identified ones of the stored data transfer requests comprises entering a configuration code identifying those of the stored data transfer requests destined for the particular one of the request destinations for which data transfer activity is to be deferred, and identifying a duration of the user-defined period.

7. The method of claim 6, wherein entering a configuration code comprises temporarily suspending system clock functions and entering the configuration code via a static scan operation.

8. The method of claim 6, wherein entering a configuration code comprises entering the configuration code via a dynamic scan operation, thereby allowing the configuration code to be entered during continuous operation of a system clock function.

9. The method of claim 6, wherein:

entering a configuration code comprises entering an address code identifying a particular one or more of the request destinations to suspend data transfer activity; and selectively suspending prioritization and delivery of the identified ones of the stored data transfer requests comprises suspending prioritization and delivery of those of the stored data transfer requests destined for the request destination corresponding to the address code.

10. The method of claim 6, wherein entering a configuration code comprises entering a mode identifier corresponding to the user-defined period of prioritization and delivery suspension.

11. The method of claim 10, wherein the user-defined period is cyclic, such that selectively suspending prioritization and delivery of the identified ones of the stored data transfer requests is periodically suspended and enabled.

12. The method of claim 10, wherein the user-defined period is indefinite, and wherein the selective suspension of prioritization and delivery of the identified ones of the stored data transfer requests is suspended until another mode identifier is entered to lift the suspension.

13. The method of claim 1, wherein the user-defined period is cyclic such that selectively suspending prioritization and delivery of the identified ones of the stored data transfer requests is periodically suspended and enabled.

14. A method for controlling the flow of data transfer requests during normal system operations of a multiprocessing computing system having a plurality of request sources providing data transfer requests to a plurality of request destinations in accordance with a predetermined request dispatch priority scheme, wherein each data transfer request is a request for an addressed one of the request destinations to supply a data segment to a respective one of the request sources, the method comprising:

periodically performing first data transfer operations between a first request source and a targeted request destination;

initiating a second data transfer operation between a second request source and the targeted request destination, wherein the second data transfer operation is subject to a response timeout limitation;

suspending the first data transfer operations for a user-defined period upon recognition of initiation of the second data transfer operation;

enabling the second data transfer operations during the user-defined period; and upon expiration of the user-defined period, enabling both the first data transfer operations and the second data transfer operations in accordance with the predetermined request dispatch priority scheme.

15. The method of claim 14, further comprising storing the data transfer requests of the first and second data transfer operations in a queue.

16. The method of claim 15, wherein suspending the first data transfer operations for a user-defined period comprises entering a configuration code identifying those of the stored data transfer requests from the first request source that are destined for the targeted request destination, and identifying a duration of the user-defined period.

17. The method of claim 16, wherein entering a configuration code comprises entering the configuration code via a dynamic scan operation, thereby allowing the configuration code to be entered during continuous operation of a system clock function.

18. The method of claim 16, wherein:

entering a configuration code comprises entering an address code identifying the targeted request destination; and suspending the first data transfer operations further comprises suspending delivery of the stored data transfer requests from the first request source that are destined for the targeted request destination identified by the address code.

19. The method of claim 16, wherein entering a configuration code comprises entering a mode identifier corresponding to a length of time of the user-defined period of delivery suspension.

20. A method for controlling the flow of data transfer requests during offline testing of a multiprocessing computing system having a plurality of request sources capable of providing data transfer requests to a plurality of request destinations in accordance with a predetermined request dispatch priority scheme, the multiprocessing computing system including a main storage unit having a plurality of data transfer queues that operate in parallel to temporarily store the data transfer requests from the request sources to the request destinations, the method comprising:
   selecting a first one of the plurality of data transfer queues to initialize the memory in the main storage unit;
   loading a number of known data transfer requests into second ones of the plurality of data transfer queues, wherein the second ones of the data transfer queues comprise at least one of the remaining ones of the data transfer queues not selected to initialize the memory;
   prohibiting data transfer operations from the second data transfer queues for a user-defined period;
   executing a memory initialization sequence via the first data transfer queue; and
   enabling the data transfer operations from the second data transfer queues upon expiration of the user-defined period.

21. The method of claim 20, further comprising:
   determining an actual state of the memory upon completion of the memory initialization sequence; and
   comparing the actual state of the memory with an expected state of the memory.

22. The method of claim 20, wherein prohibiting data transfer operations from the second data transfer queues for a user-defined period comprises:
   entering an address code identifying those of the data transfer requests from the second data transfer queues and preventing the second data transfer queues from outputting the data transfer requests; and
   entering a mode identifier which specifies a duration of the user-defined period.

23. A data transfer request interface circuit for use in a multiprocessing computing system having at least one request source to provide data transfer requests to at least one request destination, the interface circuit comprising:
   a queuing circuit coupled to each of the request sources to receive and temporarily store the data transfer requests;
   a priority logic circuit coupled to the queuing circuit to prioritize a sequence by which the stored data transfer requests are output from the queuing circuit in accordance with a predetermined priority algorithm;
   a masking register coupled to the priority logic circuit to mask predetermined ones of the stored data transfer requests from being considered by the priority logic circuit in response to a masking signal pattern provided to the masking register, thereby retaining the predetermined ones of the stored data transfer requests in the queuing circuit while allowing remaining ones of the stored data transfer requests to be prioritized and output from the queuing circuit; and
   a configurable request flow controller coupled to the masking register to generate the masking signal pattern in response to user-defined parameters, wherein the user-defined parameters define at least which of the stored data transfer requests are to be masked by the masking register, and the duration to which the masking signal pattern is to be sustained.

24. The data transfer request interface circuit as in claim 23, wherein the request sources comprise processing modules having associated cache memories, and wherein the data transfer requests comprise requests for a transfer of one or more cache lines of the cache memories to a desired one of the request destinations.

25. The data transfer request interface circuit as in claim 24, wherein the request destinations comprise particular address buses identifying corresponding storage banks in a main storage unit of the multiprocessing computing system.

26. The data transfer request interface circuit as in claim 24, wherein the request destinations comprise storage queues to temporarily store the data transfer requests for subsequent delivery to one of the processing modules.

27. The data transfer request interface circuit as in claim 23, further comprising a dynamic scan circuit coupled to the configurable request flow controller to provide the user-defined parameters to input registers within the configurable request flow controller while maintaining system clock functionality.

28. The data transfer request interface circuit as in claim 23, wherein the configurable request flow controller comprises a plurality of time selection circuits, one for each of the request destinations for which data transfer activity is to be controlled, wherein each of the time selection circuits comprises:
   a timing circuit to generate a plurality of digital waveforms having different periods;
   a first programmable register to designate, using the user-defined parameters, a desired one of the digital waveforms; and
   a waveform selector coupled to receive the digital waveforms and the user-defined parameters corresponding to the desired one of the digital waveforms, and to output the desired digital waveform in response thereto.

29. The data transfer request interface circuit as in claim 28, wherein the configurable request flow controller further comprises a destination resource selection circuit coupled to the waveform selector to receive the desired one of the digital waveforms from each of the plurality of time selection circuits, wherein the destination resource selection circuit selects one or more of the desired ones of the digital waveforms from each of the plurality of time selection circuits to generate the masking signal pattern to provide to the masking register.

30. The data transfer request interface circuit as in claim 29, further comprising a second programmable register coupled to the destination resource selection circuit to dynamically designate via the user-defined parameters which of the digital waveforms from each of the plurality of time selection circuits to include as part of the masking signal pattern.

31. A data transfer request interface circuit for use in a multiprocessing computing system having at least one request source to provide data transfer requests to at least one request destination, the interface circuit comprising:
   queuing means coupled to each of the request sources for receiving and storing the data transfer requests;
   request prioritization means coupled to the queuing means for prioritizing a delivery order of the stored data transfer requests from the queuing means;

request masking means coupled to the request prioritization means for disabling prioritization and delivery of predetermined ones of the stored data transfer requests in response to a masking signal pattern, thereby retaining the predetermined ones of the stored data transfer requests in the queuing means while allowing remaining ones of the stored data transfer requests to be prioritized and output by the queuing means;

flow control means coupled to the request masking means for generating the masking signal pattern in response to user-defined parameters, wherein the user-defined parameters define at least which of the stored data transfer requests are to be disabled from delivery, and the duration to which the masking signal pattern is to be sustained.

32. The data transfer request interface circuit as in claim 31, wherein the flow control means comprises a plurality of time selection means, one for each of the request destinations for which data transfer activity is to be controlled, wherein each of the time selection means comprises:

waveform generation means for generating a plurality of digital waveforms having different periods;

a first programmable register to designate, using the user-defined parameters, a desired one of the digital waveforms; and waveform selection means coupled to receive the digital waveforms and the user-defined parameters corresponding to the desired one of the digital waveforms, for outputting the desired digital waveform in response to the user-defined parameters.

33. The data transfer request interface circuit as in claim 32, wherein the flow control means further comprises destination resource selection means coupled to the waveform selection means for receiving the desired one of the digital waveforms from each of the plurality of time selection means, and for selecting one or more of the desired ones of the digital waveforms from each of the plurality of time selection means for generating the masking signal pattern to provide to the request masking means.

* * * * *